(12) United States Patent
Kim et al.

(10) Patent No.: US 8,292,575 B2
(45) Date of Patent: Oct. 23, 2012

(54) FAN FOR AIR CONDITIONER

(75) Inventors: In Gyu Kim, Jinhae-si (KR); Byung Il Park, Changwon-si (KR); Ja Hyung Koo, Changwon-si (KR); Yang Ho Kim, Changwon-si (KR); Kyeong Wook Heo, Changwon-si (KR); Si Kyong Sung, Changwon-si (KR); Dong Hyuk Lee, Jinhae si (KR); Young Hwan Ko, Changwon-si (KR); Jun Hyeon Hwang, Changwon-si (KR); Ho Jin Song, Gimhae-si (KR); Jin Seong Hwang, Busan (KR); Young Ho Hong, Gimhae-si (KR); Hwan Jong Choi, Busan (KR); Geun Bae Hwang, Changwon-si (KR); Chun Su Kang, Ulsan (KR); Tae Geun Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 881 days.

(21) Appl. No.: 11/547,858

(22) PCT Filed: Aug. 19, 2004

(86) PCT No.: PCT/KR2004/002084
§ 371 (c)(1),
(2), (4) Date: Sep. 7, 2007

(87) PCT Pub. No.: WO2005/096715
PCT Pub. Date: Oct. 20, 2005

(65) Prior Publication Data
US 2008/0127671 A1    Jun. 5, 2008

(30) Foreign Application Priority Data

Apr. 9, 2004 (KR) .................... 10-2004-0024627

(51) Int. Cl.
*F04D 29/44* (2006.01)
(52) U.S. Cl. .................................. 415/204; 417/423.7
(58) Field of Classification Search ............... 417/423.7; 415/204
See application file for complete search history.

(56) References Cited

U.S. PATENT DOCUMENTS 1,781,155 A    11/1930   Anderson
(Continued)

FOREIGN PATENT DOCUMENTS

CN    1051467 A    5/1991
(Continued)

OTHER PUBLICATIONS

Chinese Office Action dated Nov. 9, 2006 (full Chinese text and full English translation).

(Continued)

*Primary Examiner* — Cheryl J Tyler
*Assistant Examiner* — Jonathan Koagel
(74) *Attorney, Agent, or Firm* — KED & Associates, LLP

(57) ABSTRACT

A fan apparatus and an air conditioner employing such a fan apparatus are provided to reduce noise and enhance efficiency. The fan apparatus may be driven by a BLDC motor that stably drives the fan and increases an air flow rate. Heat exchange efficiency of an outdoor unit of a front suction/discharge type air conditioner may be improved by such a fan apparatus driven by such a BLDC motor.

69 Claims, 24 Drawing Sheets

U.S. PATENT DOCUMENTS

| | | | | |
|---|---|---|---|---|
| 2,386,883 | A | 10/1945 | Ames | |
| 2,936,947 | A | 5/1960 | Staak | |
| 2,984,089 | A | 5/1961 | Whitesel | |
| 3,127,092 | A | 3/1964 | Shenberger | |
| 3,131,468 | A | 5/1964 | Jordan et al. | |
| 3,175,755 | A | 3/1965 | Rockafield | |
| 3,524,328 | A | 8/1970 | Schuster | |
| 3,619,088 | A | 11/1971 | Bullock | |
| 3,665,727 | A | 5/1972 | Mather | |
| 3,680,328 | A | 8/1972 | McCarty | |
| 3,775,029 | A * | 11/1973 | Ranz | 417/353 |
| 3,830,595 | A | 8/1974 | Carpenter | |
| 3,933,416 | A | 1/1976 | Donelian | |
| 4,199,302 | A | 4/1980 | Goettl | |
| 4,200,257 | A | 4/1980 | Litch, III | |
| 4,428,719 | A | 1/1984 | Hayashibara et al. | |
| 4,455,704 | A | 6/1984 | Williams | |
| 4,514,655 | A | 4/1985 | Hosoya | |
| 4,527,960 | A | 7/1985 | DeSisto | |
| 4,659,951 | A | 4/1987 | Angi et al. | |
| 4,795,931 | A * | 1/1989 | Sturm | 310/90 |
| 4,883,982 | A | 11/1989 | Forbes et al. | |
| 5,112,024 | A | 5/1992 | Stanko | |
| 5,203,400 | A | 4/1993 | Tsunekawa et al. | |
| 5,217,353 | A | 6/1993 | De Filippis | |
| 5,338,992 | A | 8/1994 | Tsai | |
| 5,461,880 | A | 10/1995 | Bolton et al. | |
| 5,582,026 | A | 12/1996 | Barto, Sr. | |
| 5,588,814 | A | 12/1996 | De Filippis et al. | |
| 5,737,944 | A | 4/1998 | Nishimura et al. | |
| 5,749,116 | A | 5/1998 | Wieder et al. | |
| 5,772,176 | A | 6/1998 | Keck et al. | |
| 5,798,589 | A | 8/1998 | Ohi et al. | |
| 5,810,856 | A | 9/1998 | Tveras | |
| 5,818,133 | A | 10/1998 | Kershaw et al. | |
| 5,920,139 | A | 7/1999 | Fujiwara et al. | |
| 5,944,497 | A | 8/1999 | Kershaw et al. | |
| 5,969,445 | A | 10/1999 | Horiuchi et al. | |
| 6,107,708 | A | 8/2000 | Yamaguchi | |
| 6,121,700 | A | 9/2000 | Yamaguchi et al. | |
| 6,182,460 | B1 | 2/2001 | Hernandez et al. | |
| 6,236,126 | B1 | 5/2001 | Yagi et al. | |
| 6,297,572 | B1 | 10/2001 | Sunaga et al. | |
| 6,333,576 | B1 | 12/2001 | Ishikawa et al. | |
| RE37,625 | E | 4/2002 | Wieder et al. | |
| 6,396,177 | B1 | 5/2002 | Shin et al. | |
| 6,460,382 | B1 * | 10/2002 | Kim et al. | 68/140 |
| 6,474,114 | B1 | 11/2002 | Ito et al. | |
| 6,580,193 | B2 | 6/2003 | Yoshikawa et al. | |
| 6,588,228 | B2 | 7/2003 | Choi | |
| 6,753,629 | B2 | 6/2004 | Doi et al. | |
| 6,762,521 | B2 | 7/2004 | Peter et al. | |
| 6,887,049 | B2 | 5/2005 | Chen | |
| 7,227,287 | B2 | 6/2007 | Noda et al. | |
| 7,294,942 | B2 | 11/2007 | Lee et al. | |
| 2002/0047483 | A1 * | 4/2002 | Oohashi et al. | 310/263 |
| 2003/0093007 | A1 | 5/2003 | Wood | |
| 2003/0097079 | A1 | 5/2003 | Garcia | |
| 2003/0109802 | A1 | 6/2003 | Laeseke et al. | |

FOREIGN PATENT DOCUMENTS

| | | |
|---|---|---|
| CN | 2288542 Y | 8/1998 |
| CN | 1208822 Y | 2/1999 |
| CN | 2400612 | 10/2000 |
| CN | 1160303 A | 7/2001 |
| CN | 1464928 A | 12/2003 |
| DE | 1 160 573 | 9/1961 |
| DE | 3229458 | 2/1984 |
| DE | 3508635 | 9/1985 |
| DE | 19705318 | 8/1997 |
| DE | 199 11 158 | 10/1999 |
| DE | 19911158 | 10/1999 |
| EP | 0 008 221 | 2/1980 |
| EP | 0 408 221 | 1/1991 |
| EP | 0408221 | 9/1994 |
| EP | 0361775 | 11/1994 |
| EP | 0 800 000 | 10/1997 |
| EP | 1 053 699 | 11/2000 |
| EP | 1 094 145 | 4/2001 |
| EP | 0800000 | 8/2003 |
| EP | 1387053 | 2/2004 |
| EP | 1094145 | 10/2004 |
| GB | 2140085 | 11/1984 |
| JP | 58-182465 | 10/1983 |
| JP | 4033536 | 2/1992 |
| JP | 11-332203 | 11/1999 |
| JP | 2003-220074 | 8/2003 |
| WO | 03/073010 | 9/2003 |
| WO | WO 03/073010 | 9/2003 |
| WO | WO 2004/023929 | 3/2004 |
| WO | WO 2005/069715 | 8/2005 |

OTHER PUBLICATIONS

Korean Office Action dated May 9, 2008 (full Korean text).
Chinese Office Action issued in Chinese Application No. 2004/0042714.3 dated Jan. 8, 2010.
Office Action issued in U.S. Appl. No. 11/547,784 dated Apr. 10, 2009.
Chinese Patent Gazette for Appln. No. ZL200480042716.2 dated Jul. 1, 2009.
International Search Report and Written Opinion issued in PCT/KR2004/002084 dated Jul. 10, 2006.
U.S. Office Action issued in U.S. Appl. No. 11/547,784 dated Apr. 2, 2010.
U.S. Office Action issued in U.S. Appl. No. 11/547,783 dated Oct. 25, 2010.
U.S. Office Action issued in U.S. Appl. No. 11/547,784 dated Mar. 3, 2011.
Final U.S. Office Action issued in U.S. Appl. No. 11/547,783 dated Apr. 14, 2011.

* cited by examiner

FAN FOR AIR CONDITIONER

TECHNICAL FIELD

The present invention relates to front suction/discharge type outdoor units in air conditioners for drawing air through a front and discharging heat exchanged air to the front again, and fan apparatuses applied thereto, and more particularly, to a front suction/discharge type outdoor unit in an air conditioner having a fan apparatus applied thereto, in which a stable and high efficiency BLDC motor is employed for enhancing fan, and heat exchange efficiencies.

BACKGROUND ART

In general, in the air conditioners, there are split type air conditioners each having an indoor unit and an outdoor unit respectively installed in a room space and an outdoor separately, and unit type air conditioners each having an indoor unit and an outdoor unit fabricated as one unit, for installation on a window or wall, wherein the split type air conditioners are used widely because, not only of sizes of the indoor units and the outdoor units that become the larger as cooling/heating capacities of the air conditioners become the larger, but also of heavy vibration of the outdoor units coming from compressors therein.

The split type air conditioner is provided with the indoor unit in a room to make heat exchange between low temperature, and low pressure gaseous refrigerant and air for supplying warm or cold air into a space to be air conditioned, the outdoor unit in an outdoor to compress, condense, and expand the refrigerant for making the heat exchange at the indoor unit, and refrigerant pipelines between the indoor unit and the outdoor unit.

The indoor unit is provided with an indoor case having an inlet and an outlet for drawing/discharging room air, an evaporator in the indoor case for making heat exchange between the low temperature, and low pressure gaseous refrigerant passing therethrough and air, and an indoor fan and a motor on one side of the evaporator for making room air to pass the evaporator so that cold air is discharged to the room again.

The outdoor unit is provided with an outdoor case having an inlet and an outlet for drawing/discharging outdoor air, a compressor in the outdoor case for compressing high temperature, high pressure gaseous refrigerant passed through the evaporator, a condenser for making heat exchange between the refrigerant passed through the compressor with outdoor air to condense the refrigerant into medium temperature, high pressure liquid refrigerant, expansion means, such as a capillary tube, or an electronic expansion valve for decompressing the refrigerant passed through the condenser into low temperature, low pressure gaseous refrigerant, and an axial outdoor fan and a motor on one side of the condenser for making the outdoor air to pass the condenser, wherein the motor is a single phase, or three phase induction motor having a stator mounted on an inside of a housing, and a shaft and a rotor in a central part of the stator for rotating the rotor by a rotating magnetic field formed as AC is applied to the stator.

In general, the outdoor case has the inlets in three sides for enhancing a fan efficiency, and the outlet in a top surface, for drawing air through the three sides, making the air to heat exchange, and discharging the air to the top surface.

The compressor, the condenser, the expansion means, and the evaporator are connected with the refrigerant pipelines to each other, for circulation of the refrigerant therethrough while the refrigerant is compressed, condensed, expanded, and evaporated.

In the meantime, the foregoing outdoor unit of the related art air conditioner has a limited installation place due to high concentration of a city, with consequential strengthening of environmental control, and becomes an object of complaints due to noise and heat emission. Particularly, for an apartment in a large group of apartment houses, installation of the air conditioner is regulated such that the outdoor unit is installed within a veranda due to outside appearance and noise.

Consequently, air conditioner outdoor units of a front suction/discharge type are employed in the large group of apartment houses recently, in which air is drawn only through a front, made to heat exchange, and discharged to the front, again.

However, the air conditioner outdoor units of a front suction/discharge type has low fan, and heat exchange efficiencies due to a smaller air suction area than the air conditioner outdoor unit of three side suction/discharge type.

Moreover, the general single phase or three phase induction motor used for the fan of the air conditioner outdoor unit of the front suction/discharge type has problems in that an overall efficiency is low below 40~50%, and rotation speed variation is limited to a small range due to a narrow stable torque range. If a rotation speed is outside of the stable torque range, noise becomes heavier and efficiency becomes poorer.

DISCLOSURE OF INVENTION

An object of the present invention is to provide a fan apparatus which can reduce noise, and enhance fan, and heat exchange efficiencies by employing a BLDC motor that can make stable drive of the fan, and increase an air flow rate, and a front suction/discharge type outdoor unit in an air conditioner having the same employed therein.

The object of the present invention can be achieved by providing fan apparatus for an air conditioner including an outside case, a fan housing secured to an inside of the outside case having air inlets and an air outlet, a fan mounted on an inside of the fan housing, a shaft coupled to the fan for transmission of driving force from a motor to the fan, bearings for supporting the shaft, a BLDC motor having a rotor and a stator for providing rotation force to the fan, a supporter secured to a top of the fan housing for supporting the bearings and the stator, and a rotor bushing between the shaft and the rotor for transmission of a driving force from the rotor to the shaft.

In another aspect of the present invention, a fan apparatus for an air conditioner includes an outside case, a fan housing secured to an inside of the outside case having air inlets respectively facing upward and downward and an air outlet facing front, a sirocco fan, a centrifugal type fan, mounted on an inside of the fan housing, a shaft coupled to the sirocco fan for transmission of driving force from a motor to the sirocco fan, bearings for supporting the shaft, a supporter secured to a top of the fan housing for supporting the bearings and the stator, a rotor bushing of an insulating material joined to an end portion of the shaft opposite to a side having the fan coupled thereto, a rotor joined to the rotor bushing for transmission of driving force to the shaft through the rotor bushing, and a stator securely mounted on the supporter so as to be positioned inside of the rotor to maintain concentricity to the rotor to construe a BLDC motor together with the rotor.

In another aspect of the present invention, an outdoor unit of a front suction/discharge type in an air conditioner includes a case having a front divided into an inlet and an outlet, a compressor in the case for compressing refrigerant passed through an indoor unit, a condenser in the case for making the refrigerant passed through the compressor to heat exchange with environmental air, to condense the refrigerant, a fan in the case for making air drawn through the inlet to pass through a heat exchanger, and to be discharged through the outlet, a fan housing secured in the case for guiding an air flow path introduced into/discharged from the fan, the fan housing having the fan mounted therein, a BLDC motor coupled to the fan for rotating the fan, and a supporter secured to the fan housing for supporting the BLDC motor.

BRIEF DESCRIPTION OF DRAWING

The accompanying drawings, which are included to provide a further understanding of the invention, illustrate embodiment(s) of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. In describing the embodiments, identical parts will be given to the same names, and additional and repetitive description of which will be omitted.

A fan apparatus to be applied to the air conditioner of the front suction/discharge type of the present invention will be described.

Figure 1:
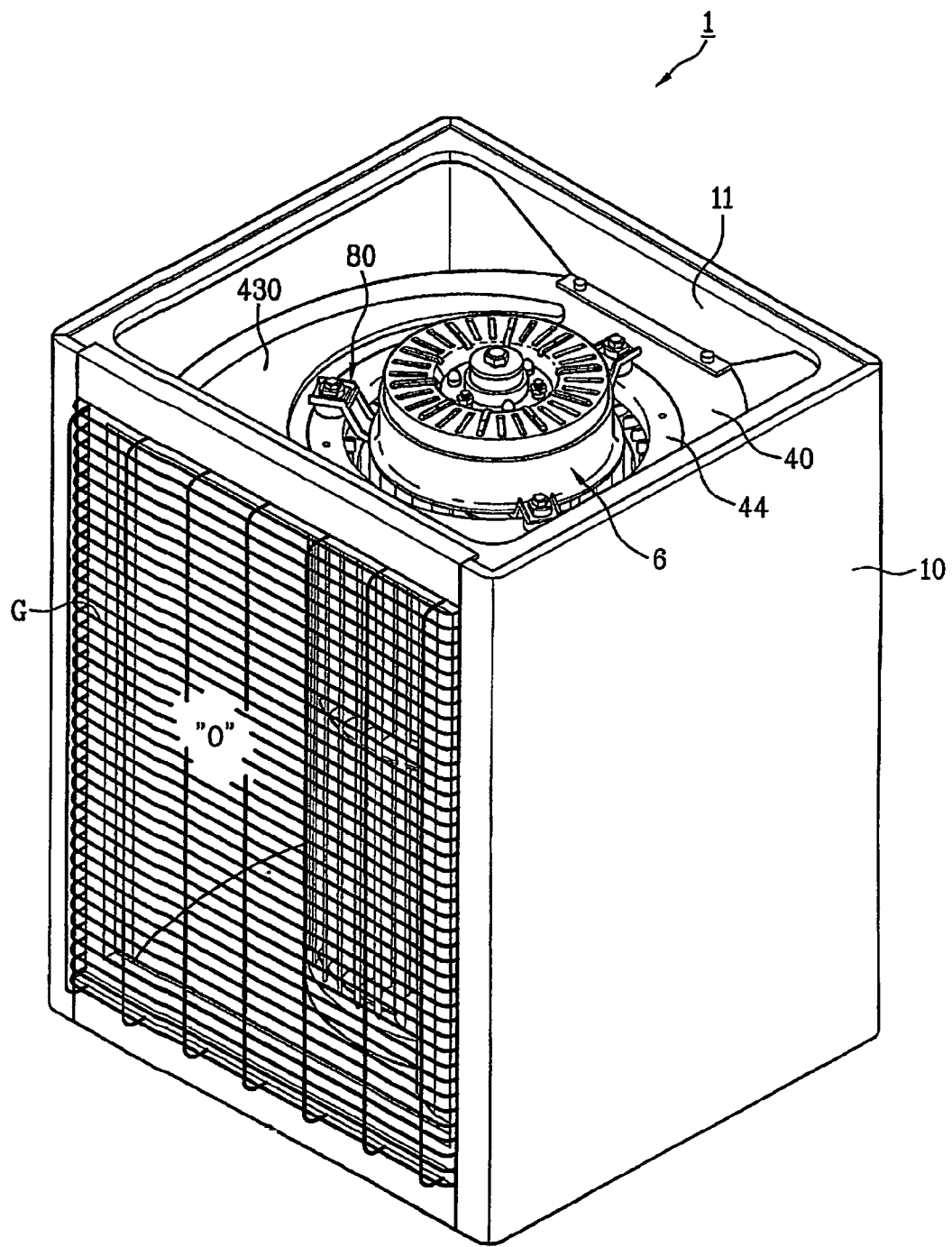
FIG. 1 illustrates a perspective view of a fan apparatus for an air conditioner in accordance with a preferred embodiment of the present invention.
Figure 2:
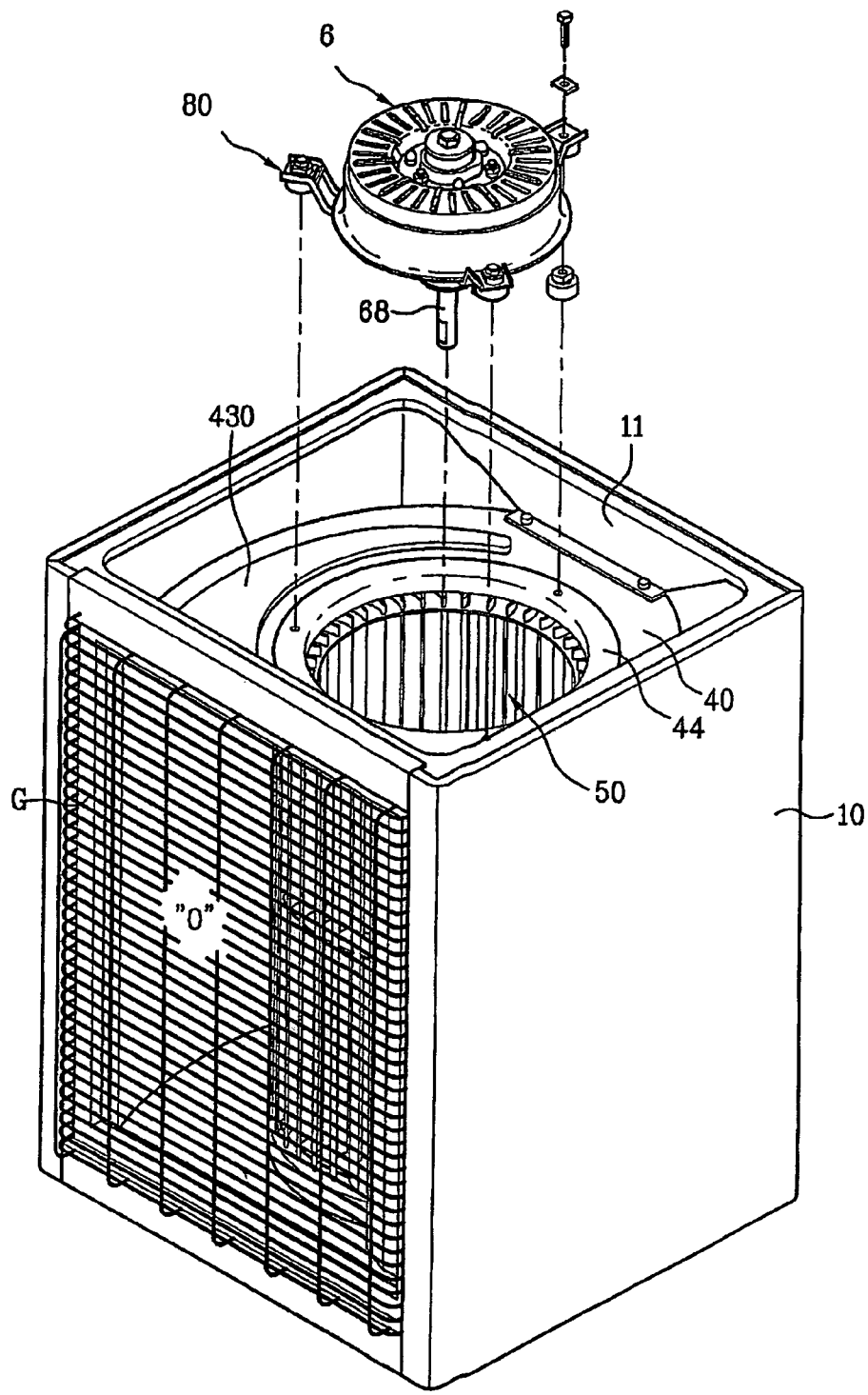
FIG. 2 illustrates a reference perspective view of an assembly of a BLDC motor and a supporter in a state the assembly is separated from a fan housing and a fan.
Figure 3A:
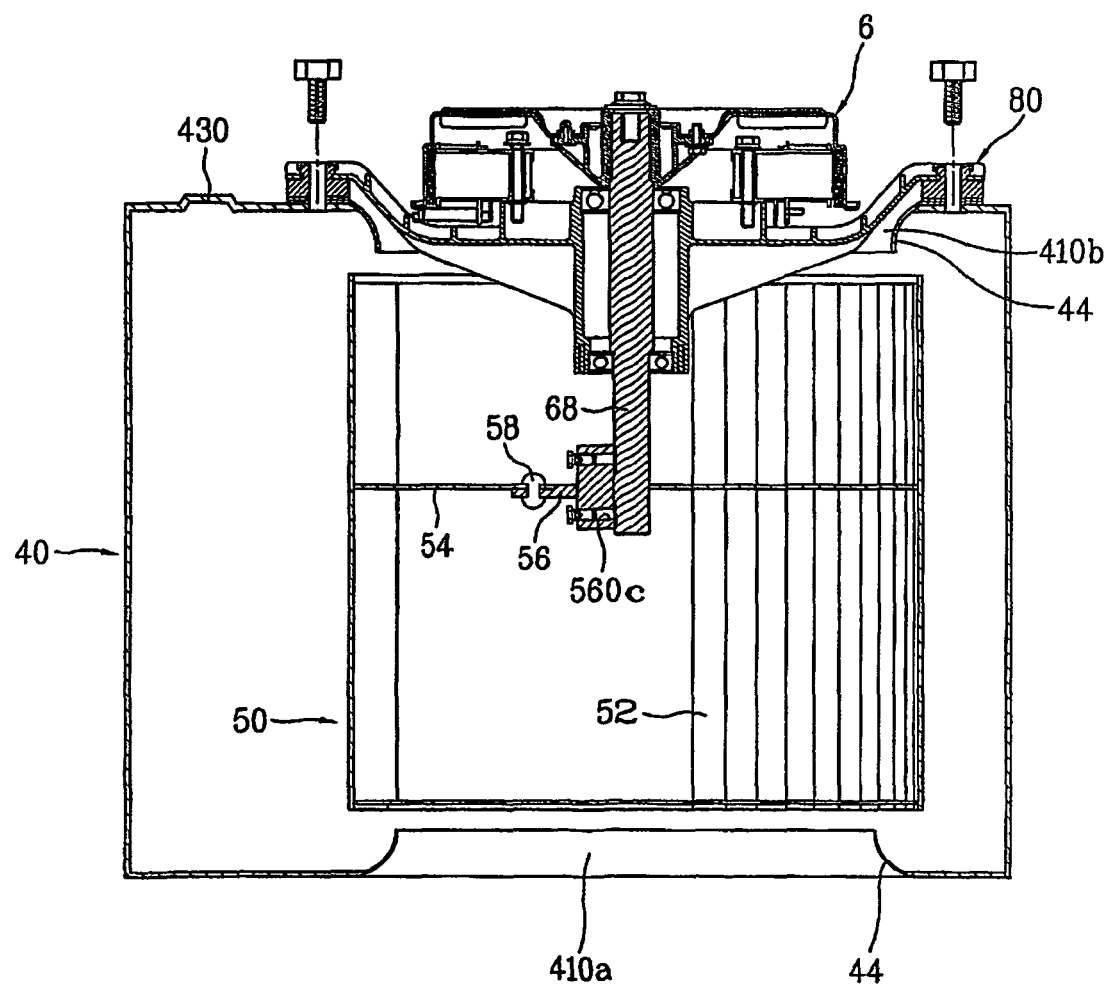
FIG. 3A illustrates a section of a fan apparatus in accordance with a preferred embodiment of the present invention.
Figure 3B:
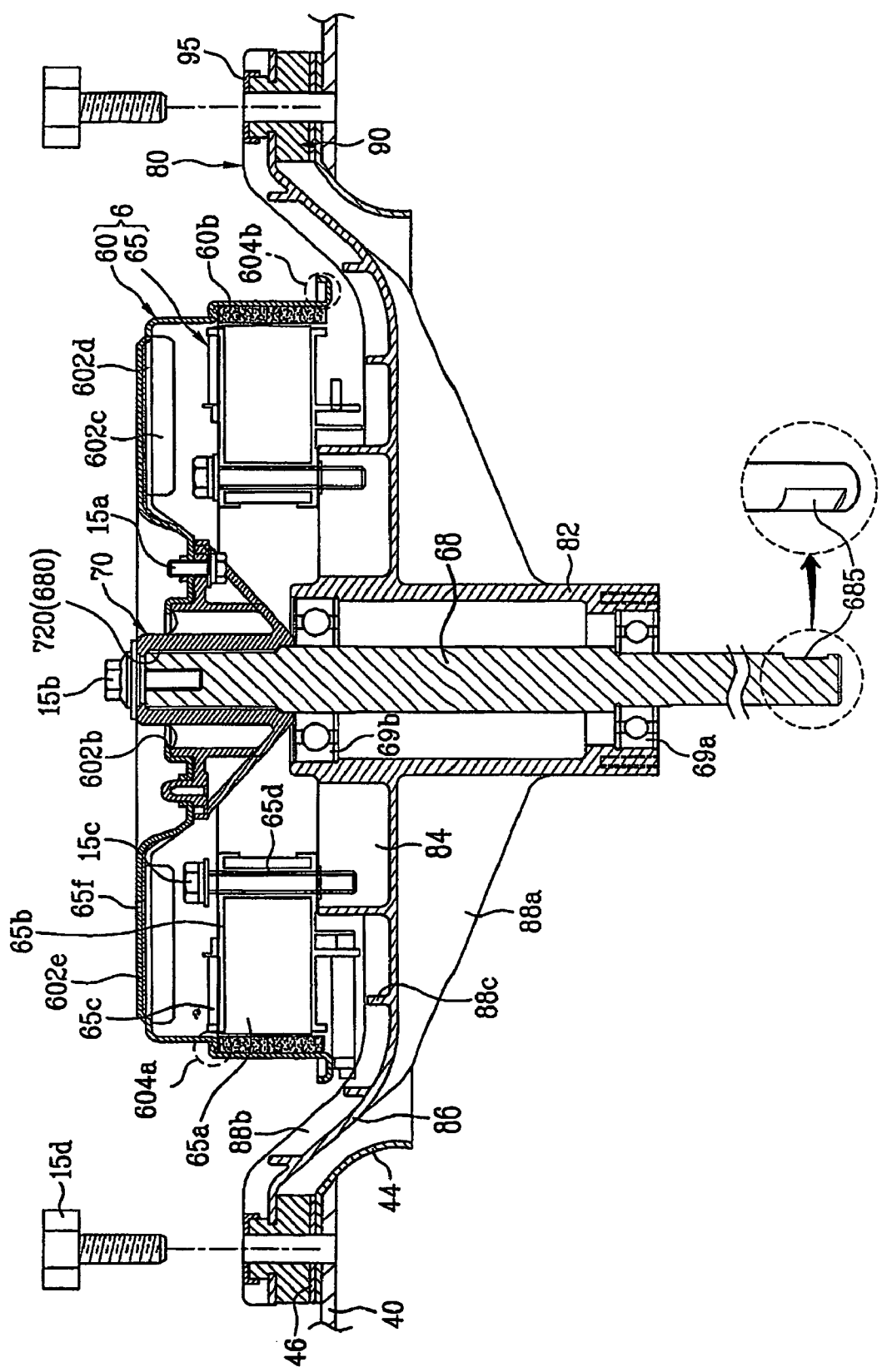
FIG. 3B illustrates a partial enlarged view of the motor and the supporter in FIG. 3A.

FIG. 1 illustrates a perspective view of a fan apparatus for an air conditioner in accordance with a preferred embodiment of the present invention, FIG. 2 illustrates a reference perspective view of an assembly of a BLDC motor and a supporter in a state the assembly is separated from a fan housing and a fan, FIG. 3A illustrates a section of a fan apparatus in accordance with a preferred embodiment of the present invention, and FIG. 3B illustrates a partial enlarged view of the motor and the supporter in FIG. 3A.

Figure 4A:
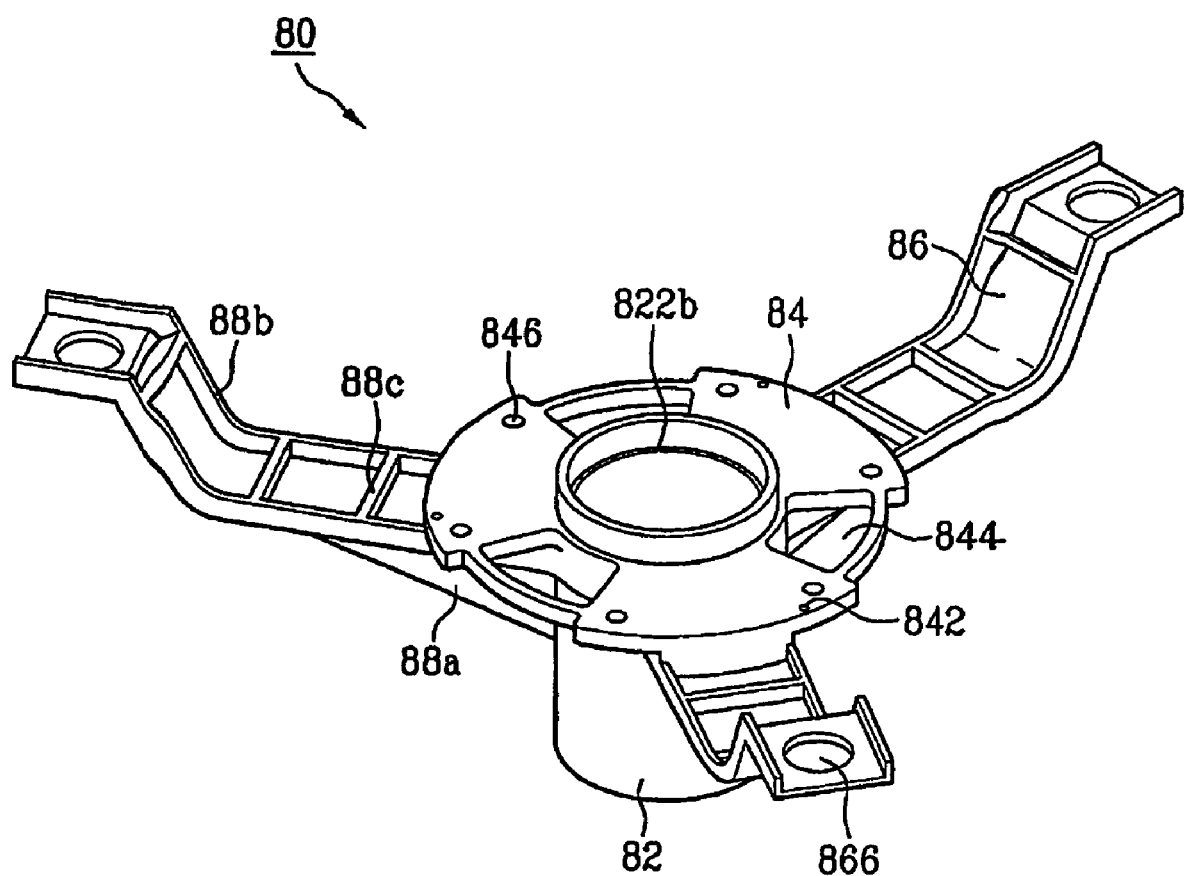
FIG. 4A illustrates a perspective view of the supporter in FIG. 3A.
Figure 4B:
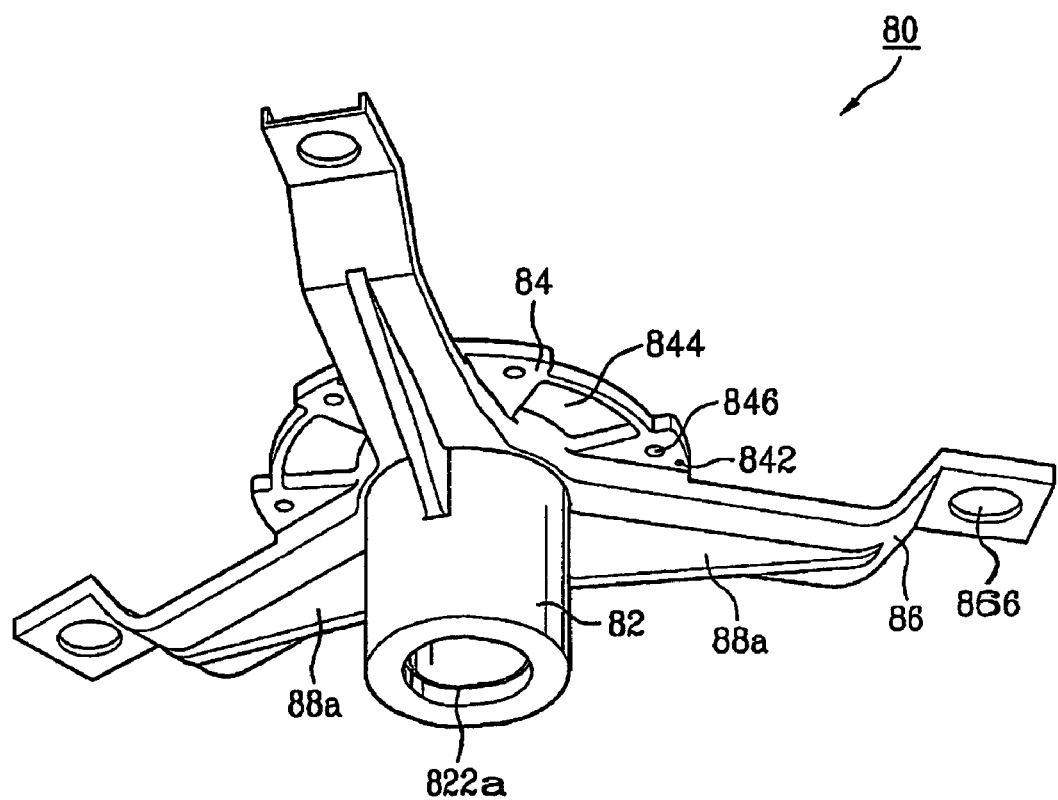
FIG. 4B illustrates a bottom perspective view of FIG. 4A.
Figure 5:
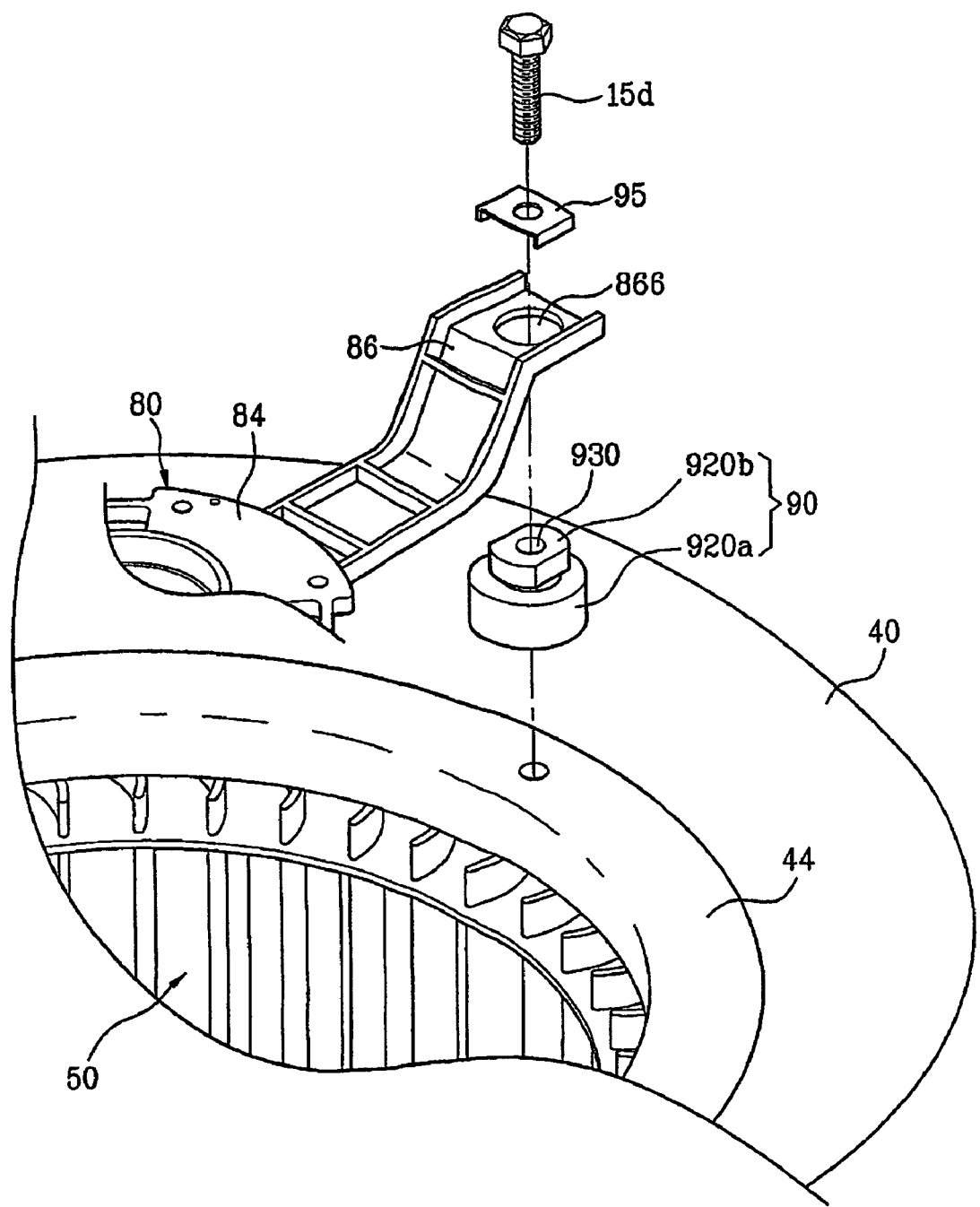
FIG. 5 illustrates a partial perspective view showing a state in which a vibration damping member is mounted on a supporter securing portion of a supporter.

FIG. 4A illustrates a perspective view of the supporter in FIG. 3A, FIG. 4B illustrates a bottom perspective view of FIG. 4A, and FIG. 5 illustrates a partial perspective view showing a state in which a vibration damping member is mounted on a supporter securing portion of a supporter.

Figure 6A:
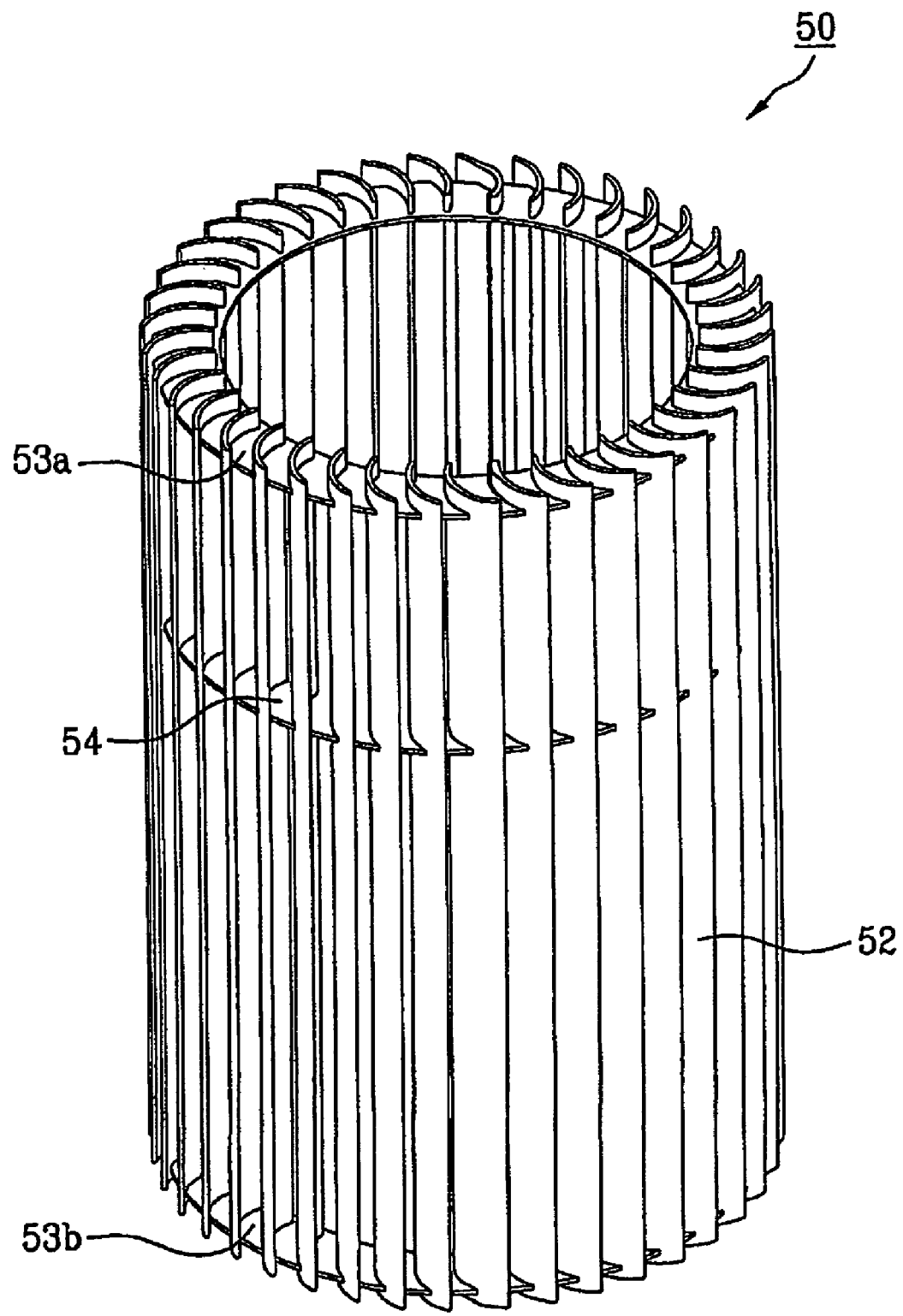
FIG. 6A illustrates a perspective view of the sirocco fan in FIG. 3A.
Figure 6B:
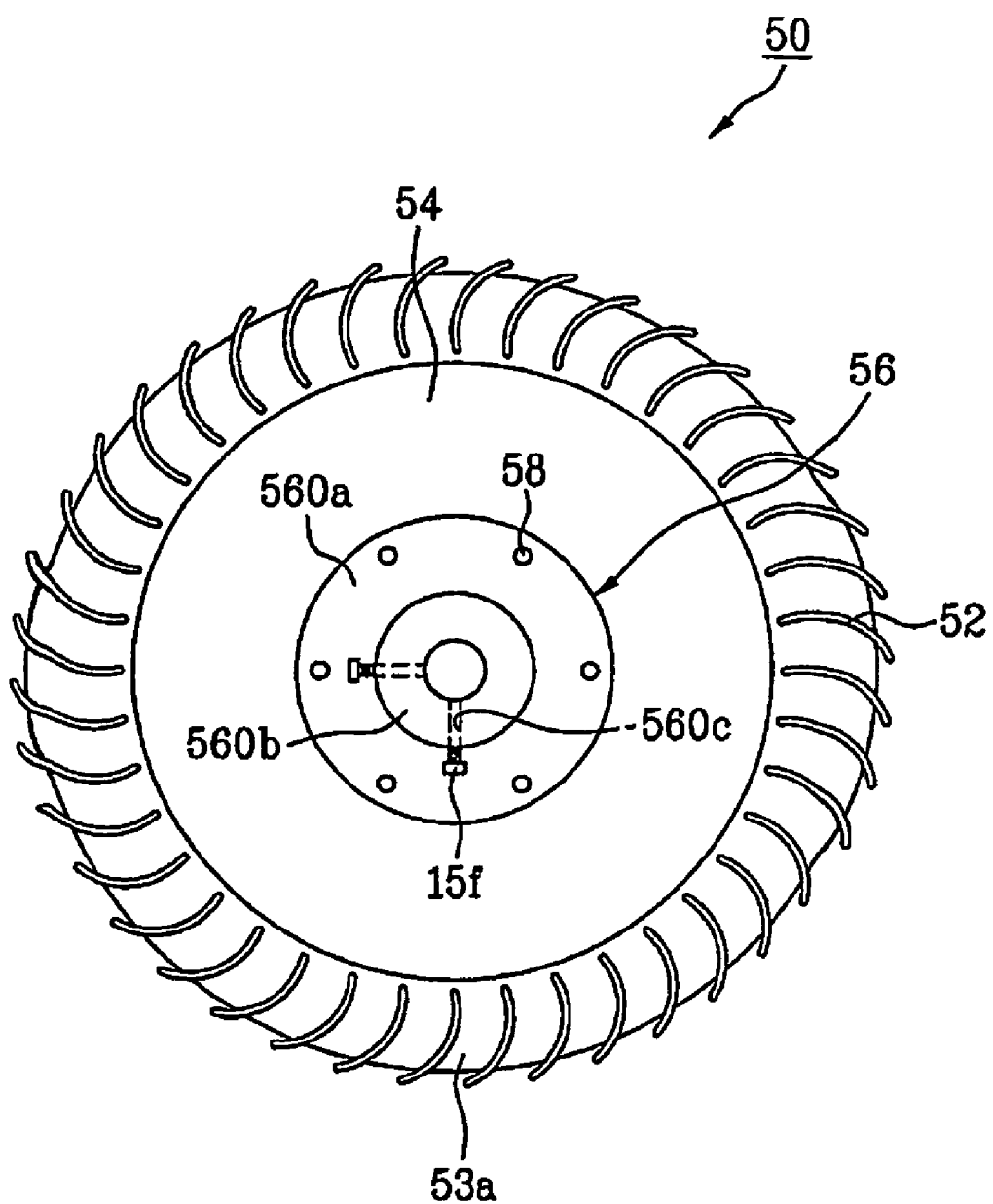
FIG. 6B illustrates a plan view of FIG. 6A.
Figure 7A:
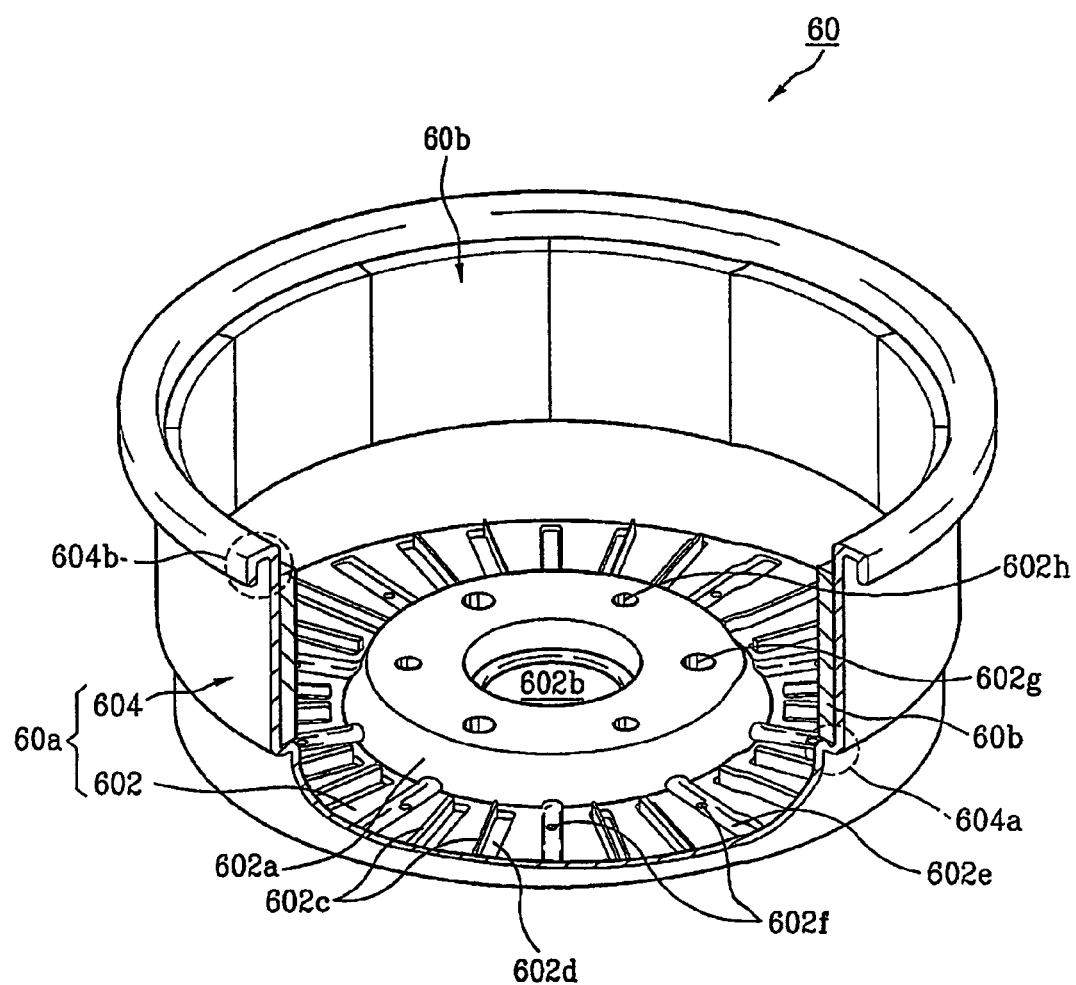
FIG. 7A illustrates a perspective view of the rotor in FIG. 3A, with a partial cut away view.
Figure 7B:
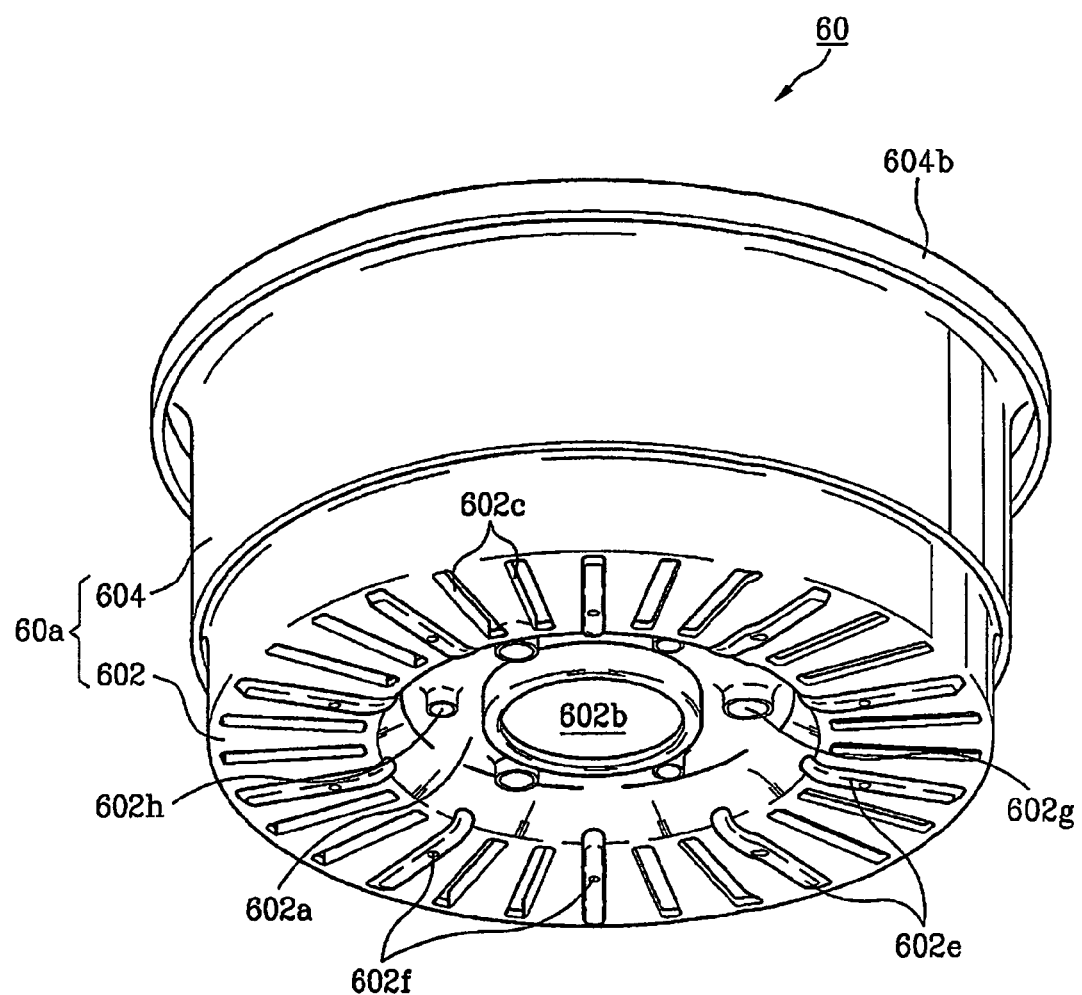
FIG. 7B illustrates a bottom perspective view of FIG. 7A.

FIG. 6A illustrates a perspective view of the sirocco fan in FIG. 3A, FIG. 6B illustrates a plan view of FIG. 6A, FIG. 7A illustrates a perspective view of the rotor in FIG. 3A, with a partial cut away view, and FIG. 7B illustrates a bottom perspective view of FIG. 7A.

Figure 8A:
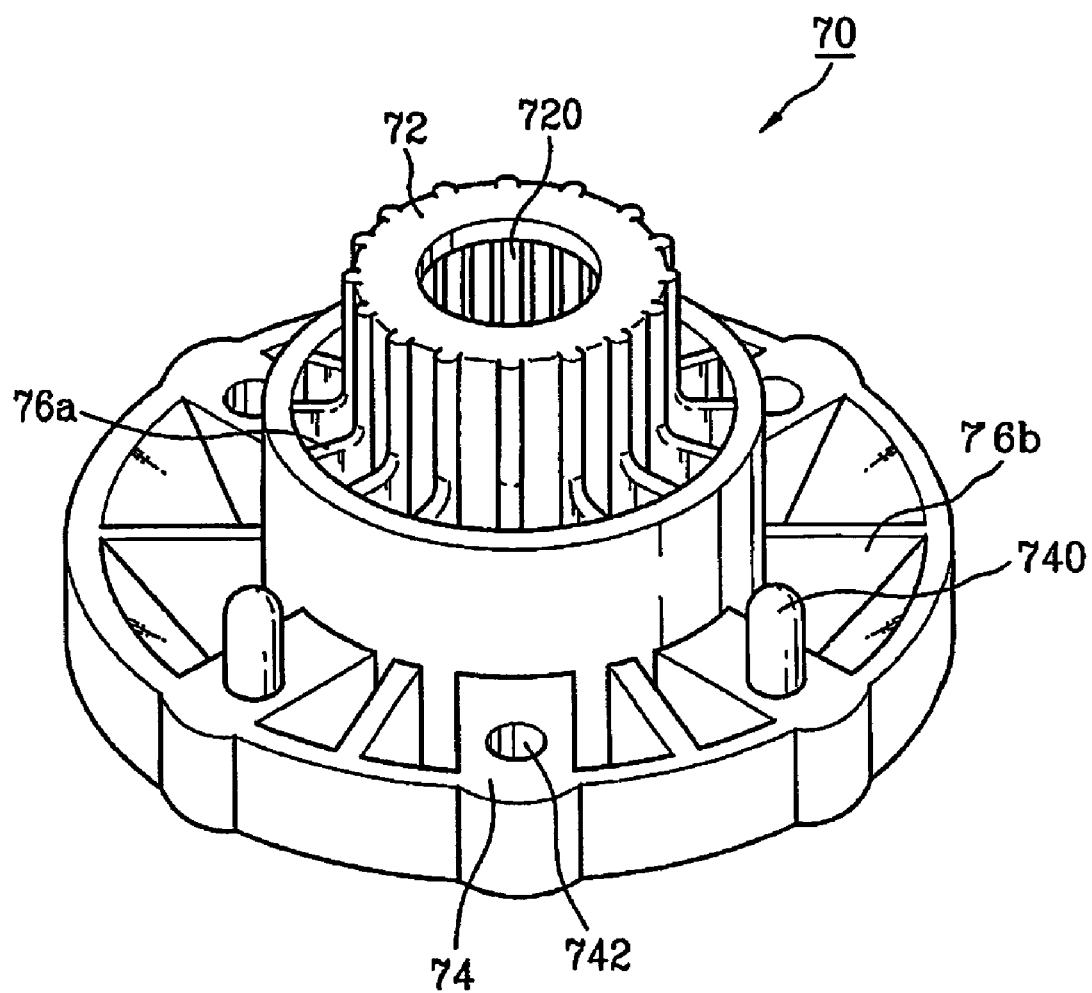
FIG. 8A illustrates a perspective view of the rotor bushing in FIG. 3A.
Figure 8B:
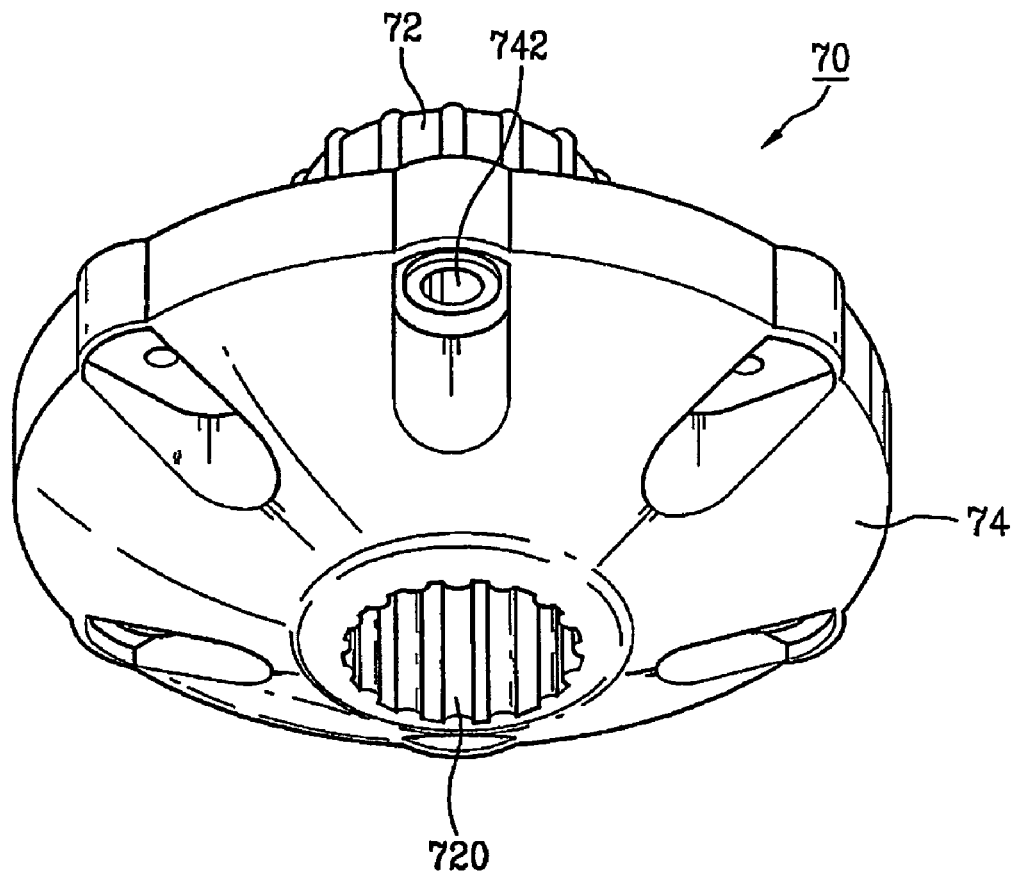
FIG. 8B illustrates a bottom perspective view of FIG. 8A.
Figure 9:
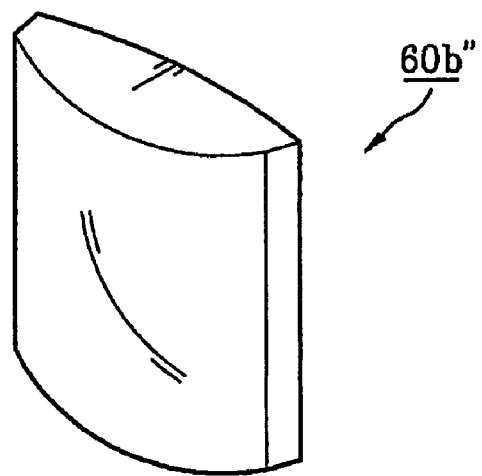
FIG. 9 illustrates a perspective view of a magnet applied to a rotor in accordance with another embodiment of the present invention.

FIG. 8A illustrates a perspective view of the rotor bushing in FIG. 3A, FIG. 8B illustrates a bottom perspective view of FIG. 8A, and FIG. 9 illustrates a perspective view of a 'C' shaped magnet.

Figure 10:
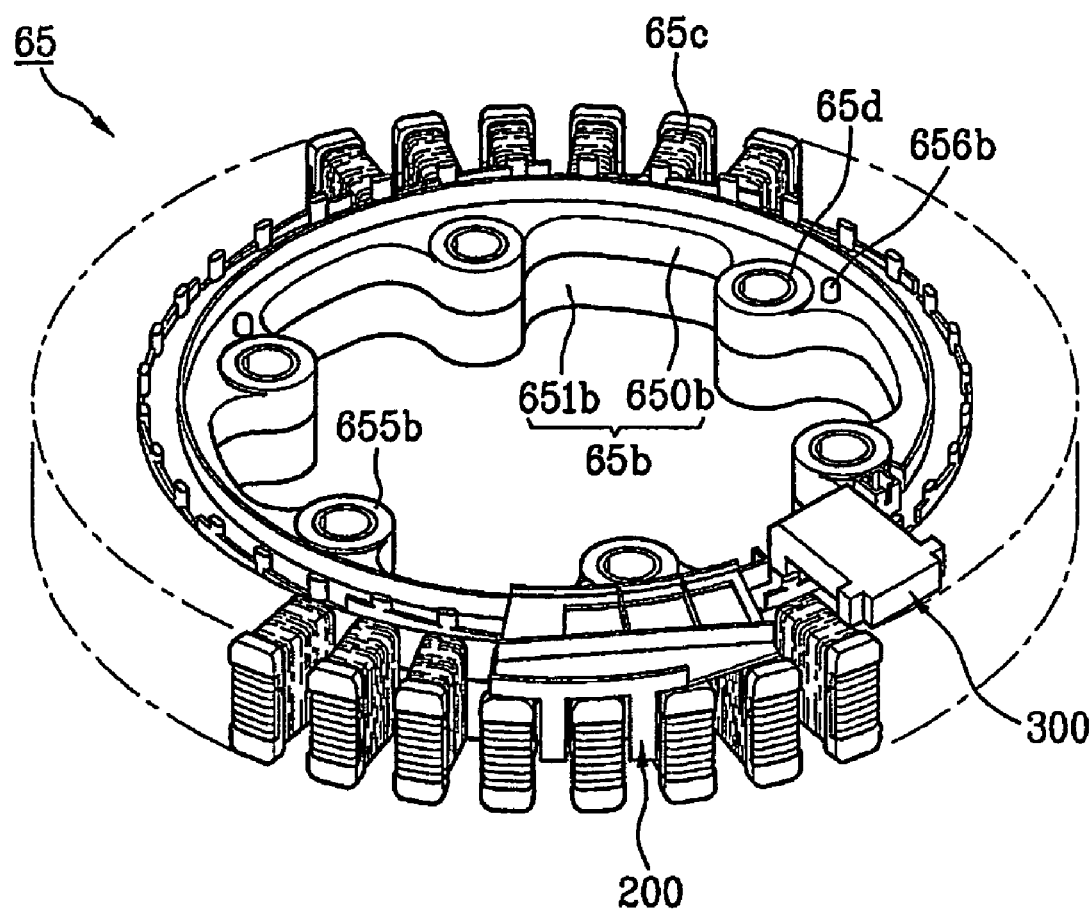
FIG. 10 illustrates a perspective view of the stator in FIG. 3A.
Figure 11:
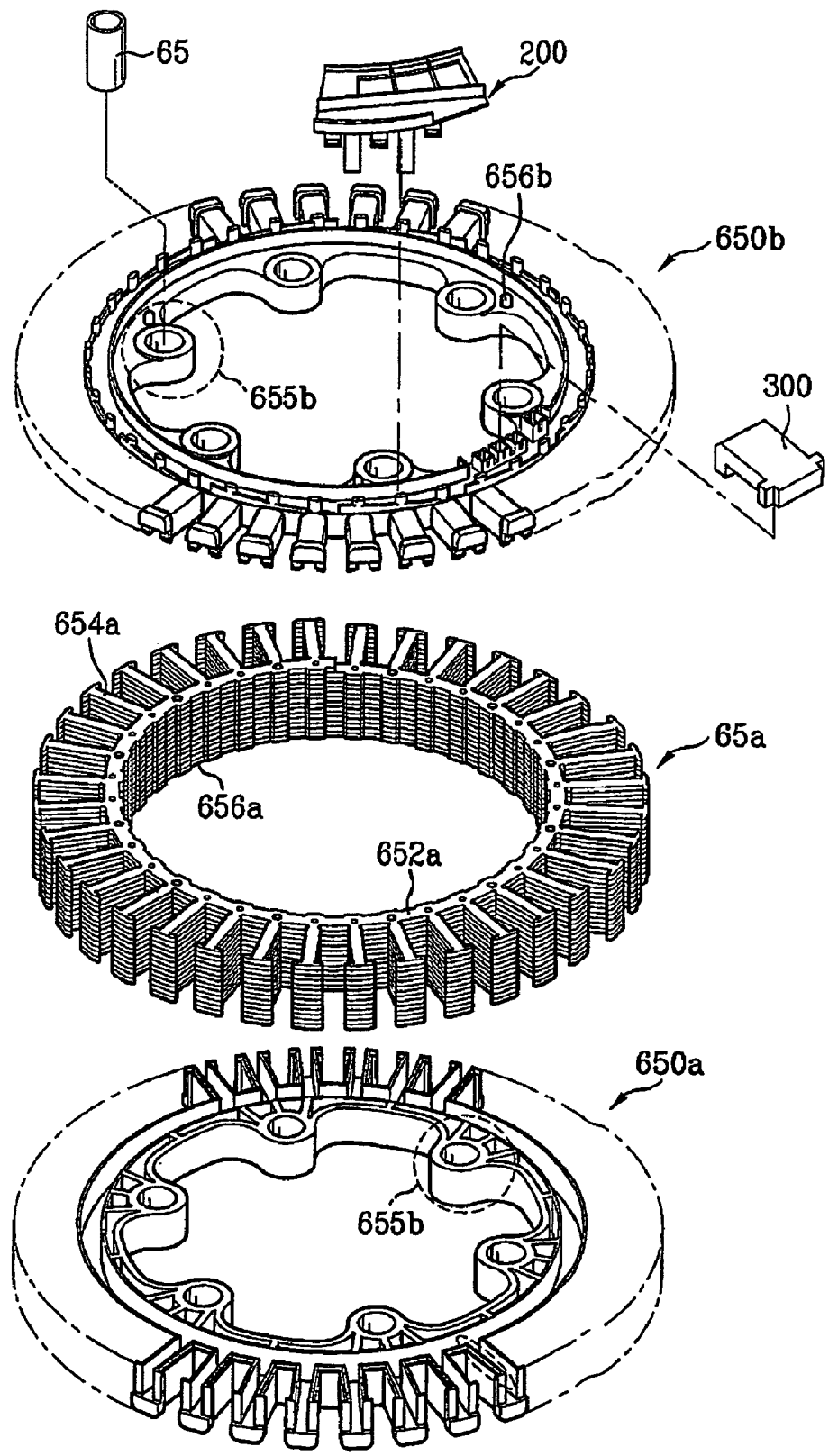
FIG. 11 illustrates a disassembled perspective view of FIG. 10.
Figure 12:
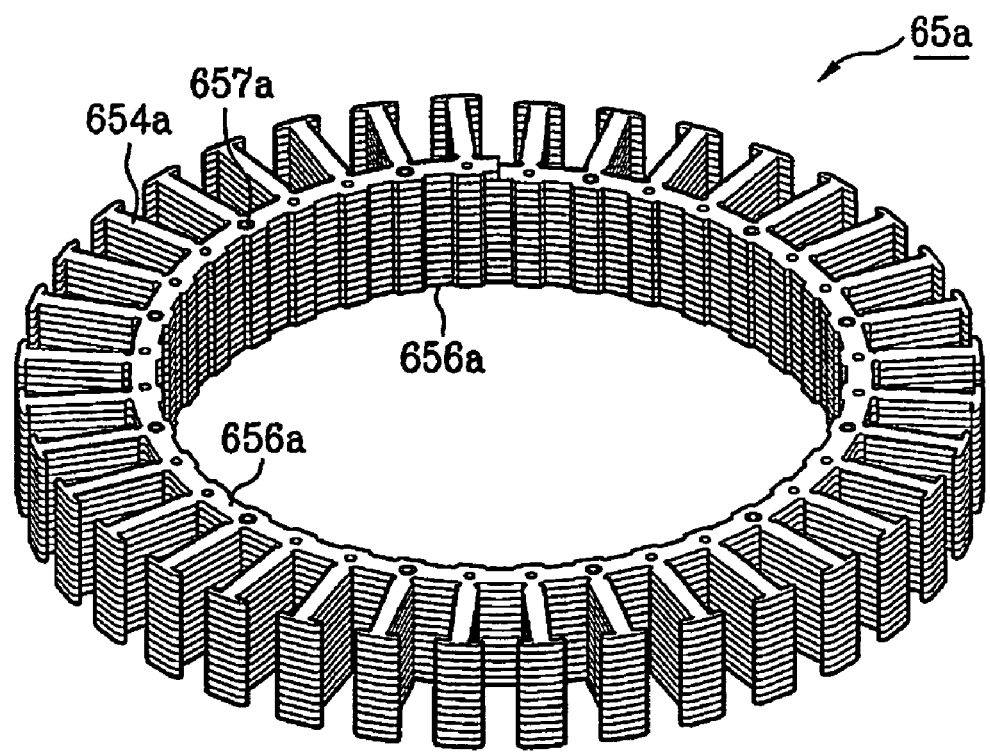
FIG. 12 illustrates a perspective view of a helical core, as an enlarged view of the core in FIG. 11.

FIG. 10 illustrates a perspective view of the stator in FIG. 3A, FIG. 11 illustrates a disassembled perspective view of FIG. 10, and FIG. 12 illustrates a perspective view of a helical core, as an enlarged view of the core in FIG. 11.

The fan apparatus 1 of the present invention includes an outside case 10, a fan housing 40 secured to an inside of the outside case 10 having air inlets 410a and 410b in top and bottom, and an air outlet in a front, a sirocco fan 50, a centrifugal fan, mounted on an inside of the fan housing 40, a shaft 68 fixed to the sirocco fan 50, for transmission of power from a motor to the sirocco fan 50, bearings 69a and 69b for supporting the shaft 68, a supporter 80 secured to an upper surface of the fan housing 40, for supporting the bearings 69a and 69b and a stator 65, a rotor bushing 70 of an insulating material secured to an opposite end portion of a fan connecting portion of the shaft 68, a rotor 60 secured to the rotor bushing 70 for transmission of power to the shaft 68 through the rotor bushing 70, and the stator 65 securely mounted on the supporter 80 so as to be positioned inside of the rotor 60 to maintain concentricity to the rotor 60 to construe a BLDC motor 6 together with the rotor 60.

Sides of the outside case 10 facing the air outlet and the air inlets 410a, and 410b of the fan housing 40 are opened, and a grill G is mounted on an opened side facing the air outlet of the fan housing 40.

In the meantime, the fan housing 40 includes an air inlet 410a in a bottom, and an air inlet 410b in a top spaced a distance from the bottom, which can also be used as an opening for mounting a motor, and an air outlet in one of sidewalls which connect the bottom and the top and surround the sirocco fan 50. It is preferable that the fan housing 40 is formed of metal sheet.

In the meantime, the sirocco fan 50 is mounted in the fan housing 40 such that an axis of the fan housing 40 is eccentric from an axis of the fan housing 40. That is, the axis of the fan housing 40 is not coincident with the axis of the sirocco fan 50, but spaced from the axis of the sirocco fan 50. Therefore, as can be noted in FIG. 3A, left and right side spaces between the fan housing 40 and the sirocco fan 50 differ.

Between the outside case 10, and the fan housing 40, there is a supporting bracket 11 for supporting the fan housing on the outside case 10. Though it is preferable that the supporting bracket 11 is extended from the outside case 10 as one unit and fastened to the top of the fan housing 40, the supporting bracket 11 may be placed between the outside case 10 and the fan housing 40 as a separate member.

The fan housing 40 has a reinforcing forming portion 430 substantially along a circumference direction with a width varied with a top surface of the fan housing 40 which becomes the greater as it comes to a wider portion (a front side of the outside case) (see FIG. 1).

In the meantime, there are shrouds 44 respectively mounted on the air inlet 410a in the bottom of the fan housing 40 and the air inlet 410b in the top of the fan housing 40 that also serves as a motor mounting opening, for guiding air flow introduced into the fan.

Though a case of the shroud 44 is shown as an example, in which each of the shrouds 44 includes, as separate members, a fastening surface 440a for fastening to a periphery of the top or bottom air inlet 410a or 410b of the fan housing 40, and a guide 440b of a predetermined curvature for guiding an air flow, the shrouds 44 may be formed as one unit with the fan housing 40. In this case, the shroud 44 has a thickness that becomes the thinner compared to other portion as it goes toward an end the farther.

In the meant, referring to FIGS. 3A, 3B, and 4, the supporter 80, preferably of a cast metal, such as aluminum, includes a bearing housing portion 82 having shaft 68 supporting bearings 69a and 69b, such as ball bearings, mounted therein, supporter securing portions 86 each extended outwardly in a radial direction from the bearing housing portion 82 for securing the supporter 80 to the top of the fan housing 40, and a stator 65 securing portion formed so as to join the supporter securing portions 86 to form a surface for securing the stator 65 thereto.

That is, the supporter securing portion 86 of the supporter 80 has a tripod shape.

Moreover, it is required that the supporter 80 is bent upward toward the top of the fan housing 40 such that ends of the supporter securing portions 86 are positioned above a stator fastening surface, for positioning at least the stator fastening surface of the supporter inside of the fan housing 40 when the supporter is mounted on the fan housing 40.

The supporter 80 has reinforcing ribs 88a for reinforcing a strength of the supporter securing portion 86, preferably connected also to the stator securing portion 84, and an outside circumferential surface of the bearing housing portion 82.

The supporter 80 and the stator 65 have positioning projections and positioning holes 842 respectively formed in correspondence to each other for aligning concentricity of the supporter 80 and the stator 65 in fastening the stator 65 to the supporter 80. In more detail, the stator securing portion 84 of the supporter 80 have the positioning holes 842 for fixing a fastening position of the stator 65, and the stator 65 facing the stator securing portion 84 has the positioning projections (see 656b in FIG. 10). Of course, the positioning projections may be formed on the supporter, while the positioning holes may be formed on the insulator of the stator.

In the meantime, the stator securing portions 84 of the supporter 80 have pass through holes 844 for enhancing motor cooling capability.

Of steps 822a and 822b on an inside circumferential surface of the bearing housing portion 82, the step 822a at a lower portion has a "]" shape for supporting an upper end of the lower bearing 69a of the bearings mounted on outside circumferential surfaces of the shaft 68, and of steps 822a and 822b on an inside circumferential surface of the bearing housing portion 82, the step 822b at an upper portion has a "[" shape for supporting a lower end of the upper bearing 69b of the bearings mounted on outside circumferential surfaces of the shaft 68.

The shaft 68 inside of the bearing housing portion 82 for transmission of power from the rotor 60 to the fan housing 40 may have positioning steps at an upper portion and a lower portion of an outside circumferential surface for positioning the lower bearing and the upper bearing at the shaft 68.

Referring to FIGS. 3A, 3B, and 5, it is preferable that vibration damping pads 46 are provided at contact surfaces of the fan housing 40 and the shrouds 44.

In more detail, the vibration damping pads 46 are mounted between the fastening surfaces 440a of the shrouds 44 and peripheral surfaces of the air inlets 410a and 410b of the fan housing 40 in contact thereto, for cutting off transmission of vibration from the motor to the fan housing 40.

A damping member 90 is provided between the supporter securing portions 86 of the supporter 80 and the fan housing 40.

Referring to FIG. 5, the vibration damping member 90 includes a body portion 920a in contact with the fan housing 40, and a head portion 920b to be forcibly inserted through a vibration damping member securing hole 866 in the supporter securing portion 86 and held at the supporter securing portion 86. There is a pass through hole 930 through the body portion 920a and the head portion 920b.

It is preferable that a cover bracket 95 of metal, such as steel plate, is placed on the head portion 920b of the vibration damping member 90 for preventing damage to the vibration damping member 90 caused by fastening force on a fastening member, such as a bolt 15d, passed through the vibration damping member 90 at the time the supporter 80 is secured to the fan housing 40.

The cover bracket 95 is a horse shoe shaped steel piece to cover the head portion 920b.

That is, the vibration damping member 90 is secured as a neck portion between the body portion 920a and the head portion 920b is caught at an edge of the vibration damping member securing hole 866 when the head portion 920b is forcibly pushed through the vibration damping member securing hole 866 in the supporter securing portion 86. In this state, after the cover bracket 95 is placed on the head portion 920b, the bolt 15d is passed through the pass through hole 930 in the cover bracket 95 and the vibration damping member 90, and fastened to the fan housing 40, to secure the supporter 80 to the fan housing 40.

Referring to FIGS. 3A, 3B, 6A, and 6B, the sirocco fan 50 includes main plates 54 arranged on an inside of the fan along a circumferential direction thereof for connecting blades 52, each having a bushing 56 at a central portion thereof for coupling the shaft 68 to the sirocco fan 50.

At a lower end and an upper end of the blades 52, there are holding plates 53a and 53b for holding the blades together for preventing the blades from shaking at fast rotation of the fan and noise caused thereby.

The bushing 56 includes a base portion 560a of a disc shape in close contact with a main plate 54 surface, and a hub portion 560b projected from a central portion of the base portion 560a in an axis direction, and having a shaft 68 inserting hole at the central portion.

The bushing 56 has two pieces, which are riveted with rivets 58 or fastened with screws in a state the two pieces are closely fitted to opposite sides of the main plate 54.

The main plate 54 is mounted at a position nearer to the motor with reference to the middle of a length of the sirocco fan 50. This is because, of the air inlets 410a and 410b of the fan housing 40, an air flow rate through the air inlet 410a opposite to a side the motor is mounted thereon is higher.

It is preferable that the main plate 54 is positioned such that, in a case an entire length of the sirocco fan 50 between two fan ends is divided into two lengths with reference to the main plate 54, a ratio of a short length from the main plate 54 to a fan end to a long length from the main plate 54 to the other fan end falls within a range of 1:1.3~1:3.

The hub portion 560b of the bushing 56 has at least one bolt fastening hole 560c in an outside circumference, and the shaft 68 has a flat section 68S at an outside circumference of an end portion for applying a compression force of the bolt 15f passed through, and fastened to the bolt fastening hole 560c in assembly.

In assembly, as the compression force of the bolt is applied to the flat section 68S, the sirocco fan 50 is secured to the shaft 68 rigidly enough to rotate as one unit.

Referring to FIGS. 3A, and 3B, though it can be noted that the rotor bushing 70 is joined with the shaft 68 and the rotor frame 60a in a state the rotor bushing 70 is positioned under the rotor frame 60a, the rotor bushing 70 may be joined with the shaft 68 and the rotor frame 60a in a state the rotor bushing 70 is positioned over the rotor frame 60a.

In the meantime, referring to FIGS. 8A and 8B, the rotor bushing 70 includes a tooth portion 72 having a central portion for inserting and engagement of the shaft 68 therewith, and a joining portion 74 extended from a circumference of the tooth portion 72 in a radial direction for joining with the rotor frame 60a.

The joining portion 74 of the rotor bushing 70 has a plurality of positioning projections 740 formed as one unit for inserting into the positioning holes 602g in the rotor frame 60a in assembly.

The joining portion 74 of the rotor bushing 70 also has fastening holes 742 for fastening to the rotor frame 60a with bolts.

The tooth portion 72 and the joining portion 74 of the rotor bushing 70 have reinforcing ribs 76a and 76b, respectively.

The shaft 68 has serration 680 on an outside circumferential surface of the top end portion, and the rotor bushing 70 has serration 720 on an inside circumferential surface of a central hole in the tooth portion 72, for engagement with the serration 680 of the shaft 68.

That is, the rotor bushing 70 is fastened to the rotor frame 60a with fastening members such as bolts or the like passed through the fastening holes 742 in the joining portion 74, and the shaft 68, inserted through the central portion of the tooth portion 68 and connected to the rotor bushing 70 with serration engagement, is fastened to the rotor bushing 70 with the bolt 15b inserted into the fastening hole at an end portion thereof.

In the meantime, the rotor bushing 70 is formed of synthetic resin having a vibration mode different from the rotor frame 60a of steel plate.

Referring to FIGS. 3A, 3B, 7A, and 7B, the rotor 60 includes a rotor frame 60a, and magnets 60b mounted on an inside thereof, wherein the rotor frame 60a is preferably formed of steel plate taking productivity and formability into account.

However, material of the rotor frame is not limited to above, but the rotor frame 60a may be formed by injection molding, or a steel plate and an injection molding that covers an outside of the steel plate.

The rotor frame 60a includes a bottom portion 602 of a substantially disc shape, and a sidewall portion 604 extended in a substantially vertical direction from a circumference of the bottom portion 602, wherein the sidewall portion 604 has a bent portion 604a formed along a circumferential direction having a seating surface for supporting magnets 60b mounted on an inside surface thereof, and the bottom portion 602 has a hub portion 602a having a pass through hole 602b at a central portion for enabling pass of fastening members, such as bolts 15b, for fastening the rotor 60 to the shaft 68.

The bottom portion 602 of the rotor frame 60a also has fastening holes 602h in correspondence to the fastening holes 742 in the joining portion 74 of the rotor bushing 70.

In the meantime, the bottom portion 602 of a substantially disc shape, and the sidewall portion 604, extended in a substantially vertical direction from a circumference of the bottom portion 602 of the rotor frame 60a are formed as one unit by pressing, if the rotor frame 60a is formed of a steel plate.

In this instance, the sidewall portion 604 has an opened end edge bent in a radial direction outwardly for the first time, and bent again downwardly toward the bottom portion 602 for the second time.

The bent portion 604b at the opened end edge of the sidewall portion 604 of the rotor frame 60a enhances rigidity of the sidewall portion 604, and prevents distortion of the rotor occurred at a time of fast rotation, and noise caused thereby in advance.

The rotor frame 60a has a plurality of cooling fins 602c around the hub portion 602a in a radial direction for blowing air toward the stator 65 to cool heat generated at the stator 65 when the rotor 60 rotates. The cooling fin 602c has a predetermined length in a radial direction.

In the meantime, the cooling fins 602c are formed by lancing, such that the cooling fins 602c are directed toward the opening, and pass through hole 602d formed by the lancing serve as vent holes.

The cooling fin 602c is bent at 90° to the bottom portion 602 such that the cooling fin 602c is directed toward the opening of the rotor 60.

The rotor frame 60a has embossed portions 602e in the bottom portion 602 between adjacent cooling fins 602c for reinforcing the rotor frame 60a, each with a drain hole 602f for draining water.

In the meantime, as shown in FIG. 7A, the magnet 60b has an arc shape, or as shown in FIG. 9, or the magnet 60b has a 'C' shape (with reference to a substantial 'C' form of a curved portion).

Referring to FIGS. 3B, and 11 to 13, the stator 65 includes an annular helical core 65a of a multiple layer structure of a steel plate with 'T's 654a and a base portion 652a wound in a helix starting from a bottom layer to a top layer, an insulator 65*b* enclosing the core for making insulation, and having a joining portion 655*b* projected toward an inner side of the core with fastening holes for fastening the stator 65 to the fan housing 40 with fastening members, such as bolts 15*c*, and coils 65*c* wound on the 'T's 654*a*.

In this instance, the joining portion 655*b* of the stator has more than three projections toward the inner side of the core, and has a height more than 20% of a total height of the core.

Referring to FIG. 11, this is because the height more than 20% of a total height of the core of the joining portion 655*b* of the insulator is adequate for enduring vibration from the motor if the core has no other joining portion.

In the meantime, the joining portion may have metal tubes 65*d*, or instead of the metal tubes 65*d*, spring pins (not shown) each having a longitudinal incision to have a radial direction elasticity, respectively inserted in the fastening holes of the joining portion 655*b*.

The helical core 65*a* has a multiple layered structure wound in a helix starting from a bottom layer to a top layer, wherein a plurality of the T's 654*a* are projected outwardly in a radial direction from the base portion 652*a*, and the base portion 652*a* has trapezoidal or rectangular slots 656*a* for reduction of stress in winding the core.

Multiple layers of the helical core 65*a* are held together with rivets 657*a* passed through pass through holes in the base portion 652*a*, and a winding start portion and a winding end portion of the helical core 65*a* are welded to predetermined portions of the base portion in contact thereto, respectively.

Referring to FIG. 11, the insulator 65*b* has separate upper and lower pieces, for enclosing the core as the upper and lower pieces are held together.

In a case the insulator 65*b* is fabricated as separate upper and lower pieces, the insulator 65*b* includes an insulator upper 650*b* secured to an upper side of the core, and an insulator lower 651*b* secured to a bottom of the core to cover the bottom.

On the other hand, the insulator 65*b* may be fabricated, not as the separate upper and lower pieces, but fabricated by molding at a time, when the core is processed in a state the core is inserted in a synthetic resin.

The operation and blowing process of the foregoing fan apparatus of the present invention will be described.

When rotation of the rotor 60 is caused as a current flows to the coil 65*c* of the stator of the BLDC motor 6 in a sequence through a power connection tap housing assembly 300, the shaft 68 engaged to the rotor bushing 70 which is joined with the rotor 60 with serration rotates, to transmit power to the sirocco fan 50 through the shaft 68 to rotate the sirocco fan, causing the air to be drawn through the upper and lower inlets 410*a* and 410*b* in the top and bottom of the fan housing 10, and to be discharged through the outlet O in the front of the outside case 10.

In detail, as current is applied to the coil 65*c* of the stator 65 in the BLDC motor 6, electro-magnetic force is generated between the stator 65 and the magnet 60*b*, when a sensor keeps detecting a position of the magnet 60*b*, to apply the current to the coils 65*c* of the stator 65 in succession, so that the electro-magnetic force is kept generating between the stator 65 and the magnet 60*b*, to rotate the rotor 60 having the magnet 60*b* secured thereto together with the shaft 68 fixed to the rotor 60, thereby transmitting a rotation force to the sirocco fan 50.

In this instance, since the BLDC motor 6 has a wide range of stable torque characteristic, the BLDC motor 6 can, not only be operated at various rotation speeds, but also reduce noise as the BLDC motor 6 makes stable operation, and moreover, reduce power consumption.

As the sensor for motor control, a hole sensor 200 is used.

In summary, the fan apparatus 1 of the present invention discharges air in a circumferential direction after drawing the air through the bottom air inlet 410*a* of the fan housing 40 and drawing a portion of the air through the top air inlet 410*b* of the fan housing 40 when the sirocco fan 50 is rotated by the BLDC motor 6, and the discharged air is guide by the fan housing 40, until the air is discharged through the outlet O in the outside case 10.

In the meantime, the fan apparatus of the present invention has the following advantages.

The employment of the BLDC motor 6 which is stable at most of rotation speeds and has a high efficiency in driving the fan of the fan apparatus 1 enables to drive the BLDC motor while varying the rotation speeds widely, and reduce noise and power consumption as stable and high efficiency operation can be made in an entire rotation speed range.

Moreover, by effective mounting and securing of the BLDC motor 6 at one side of the fan housing having a low suction air flow rate by using separate supporter 80, with a portion of the BLDC motor sunken in the fan housing 40, the fan apparatus 1 of the present invention has an advantage of reducing an overall size of the fan apparatus.

The direct motor coupling type fan apparatus 1 enables to reduce noise, occurrence of faults, and power consumption, and product reliability is enhanced because the bearing housing is formed of metal, such as aluminum, that has no thermal distortion.

Since the rotor 60 of a steel plate of the fan apparatus 1 enables to form by pressing, with a good formability, and short fabrication time period, productivity is improved.

The fan apparatus 1 of the present invention enables easy fabrication of the rotor 60 because the sidewall portion 604, extended vertically from a circumference of the bottom portion 602 of the rotor frame 60*a*, has a bent portion 604*a* formed along a circumferential direction having a magnet 60*b* seating surface, that permits secure supporting of the magnets 60*b* when the magnets 60*b* are attached to the inside surface of the rotor.

Moreover, the plurality of radial cooling fins 602*c* each with a predetermined length around the hub portion 602*a* of the rotor frame 60*a* blow air toward the stator, to cool down heat generated at the stator 65.

The cooling fins 602*c* are formed to direct toward the opening of the rotor 60 by lancing, and the pass through holes 602*d* formed by the lancing serve as vent holes.

The easy formation of the rotor 60 of a steel plate by one time of pressing enables to shorten a time required for fabrication of the rotor, that improves productivity.

The first outward radial direction bending and the second downward bending of the opening end of the sidewall 604 of the rotor frame 60*a* enhances strength of the rotor frame 60*a*, to prevent distortion of the rotor 60 and occurrence of noise caused thereby.

Along with this, the embossed portions 602*e* between adjacent cooling fins 602*c* on the bottom portion 602 of the rotor 60 improve an overall strength of the rotor 60, and the drain holes 602*f* in the embossed portions 602*e* enable draining of water to an outside of the motor.

The rotor bushing 70 of the present invention of an injection molded synthetic resin having a vibration mode different from the rotor frame 60*a* of steel plate enables to dampen vibration of the rotor 60 in transmission to the shaft 68.

The helical core 65*a* which allows easy winding prevents waste of material, and enhances easy fabrication, and rigidity of the stator securing portion 84 of the supporter 80 is increased to reduce noise and vibration, to improve mechanical reliability and lengthen a lifetime.

That is, since the slots 656a in the base portion 652a of the helical core 65a in the stator 65 reduce stress in winding the core, the winding can be done easily with a low power.

Moreover, referring to FIG. 11, the height of the joining portion 655b of the insulator 65b of synthetic resin more than 20% of a total core height permits to have an adequate rigidity even if no metal core presents to the joining portion, to prevent breakage of the joining portion 655b caused by vibration occurred during operation of the motor.

Particularly, it is preferable that the joining portion 655b has a height the same with a total height of the core.

Though the height of the joining portion 655b may be higher than the total height of the core, it is preferable that the height of the joining portion 655b is set not to exceed two times of the total height of the core because an excessive height of the joining portion 655b increases a total height of a driving unit of the fan apparatus, which is not favorable for fabricating a compact fan apparatus.

The positioning projections 656b on the joining portion 655b matched to the positioning holes 842 in the supporter 80 enable easy joining of the stator 65.

That is, the present invention permits to secure an insulating capability and reduce transmission of vibration from the rotor to the shaft 68 owing to the rotor bushing 70 of synthetic resin having a vibration mode different from the rotor frame 60a, as well as not only a rigid securing of the stator 65 to the supporter 80, but also effective maintenance of concentricity of the stator.

The fan apparatus 1 of the present invention permits low cost and easy fabrication because the fan housing 40 is formed of a metal plate that is strong against heat and light.

Moreover, the fan apparatus 1 of the present invention has no thermal distortion even at a high temperature because the supporter 80, bearing supporting means, is formed of metal, such as aluminum.

Furthermore, the fan apparatus 1 of this embodiment can enhance a fan efficiency because the BLDC motor 6 is mounted on a side of the air inlet 410b having a relatively low suction flow rate of the air inlets 410a and 410b of the fan housing 40, that enables, not only to minimize a suction flow resistance, but also high efficiency stable operation.

Figure 17:
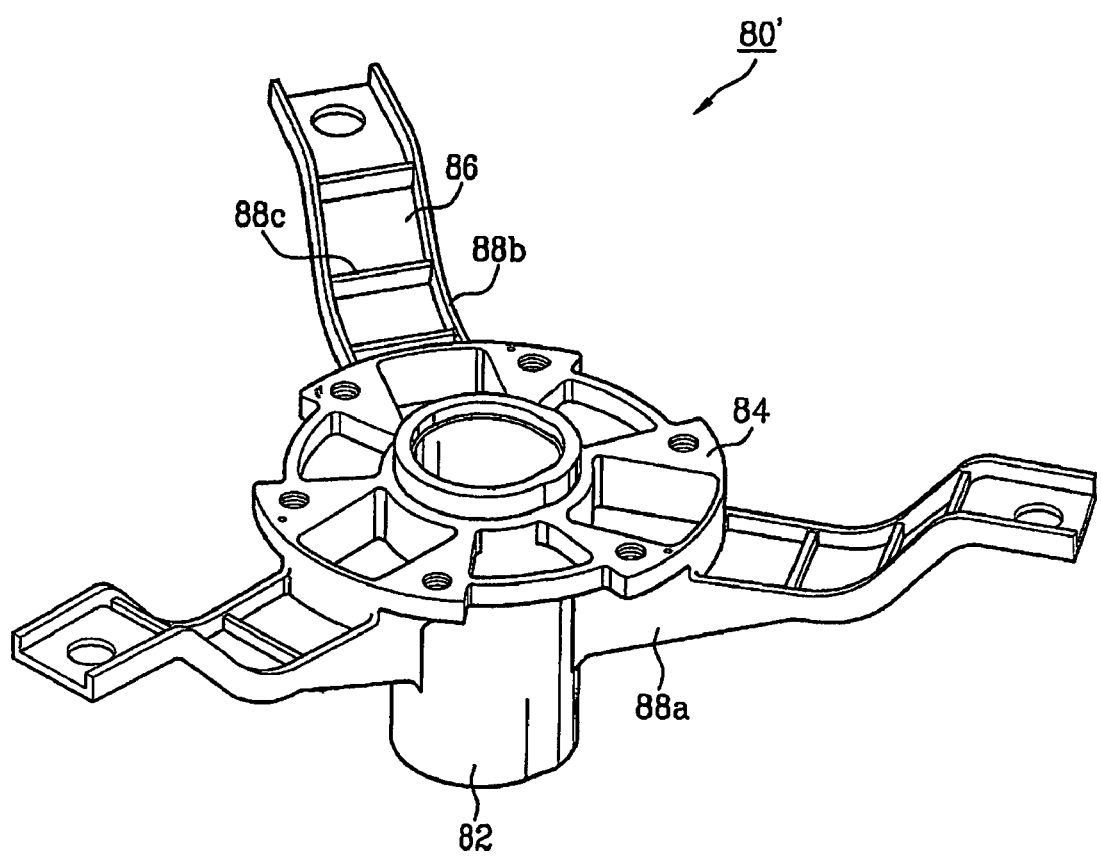
FIG. 17 illustrates a perspective view of another embodiment of a supporter applicable to the present invention.

In the meantime, FIG. 17 illustrates a perspective view of another embodiment of a supporter 80' having a basic configuration identical to the one in FIGS. 4A and 4B, even if a shape thereof is slightly different from the one in FIGS. 4A and 4B.

In this case the reinforcing ribs are different from the reinforcing ribs in FIGS. 4A and 4B. Upon comparing to FIGS. 4A, and 4B, it can be noted that a position of the reinforcing rib 88a is different.

It can be noted that, while FIGS. 4A and 4B illustrate a case when only one reinforcing rib 88a is formed on a center line of a surface of each of the stator securing portions 84, FIG. 17 illustrates a case when the reinforcing ribs 88a are formed on opposite sides of the surface of each of the supporter securing portions 86.

Moreover, though no detailed example is shown, the supporter may only include a bearing housing portion 82 on an inside of shaft supporting bearings, and a stator securing portion 84 extended in a radial direction from the bearing housing portion 82 for securing both the supporter on a top surface of the fan housing 40, and the stator on an opposite side thereof.

That is, this case is a case when the stator securing portion 84 is extended to the supporter securing portions, such that the supporter securing portions 86 are not in a spoke shape, but in a disc shape.

Figure 13:
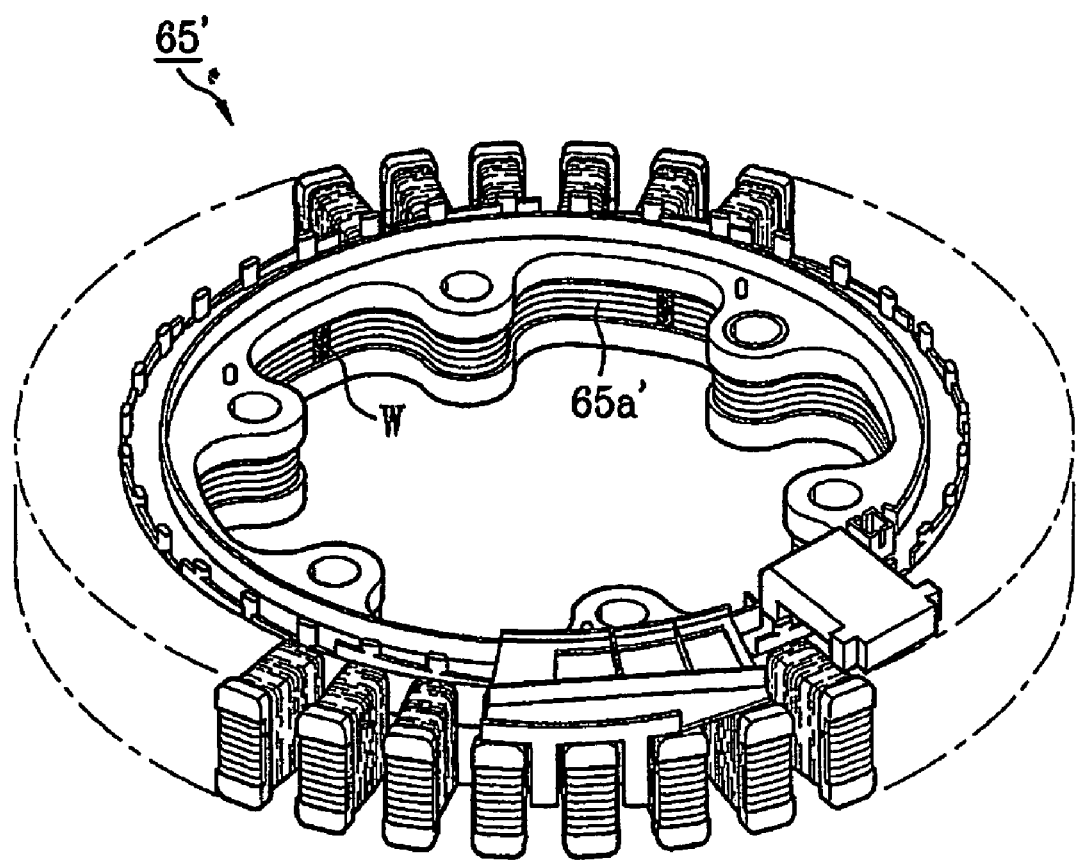
FIG. 13 illustrates a perspective view of another example of a stator applicable to the present invention.
Figure 14:
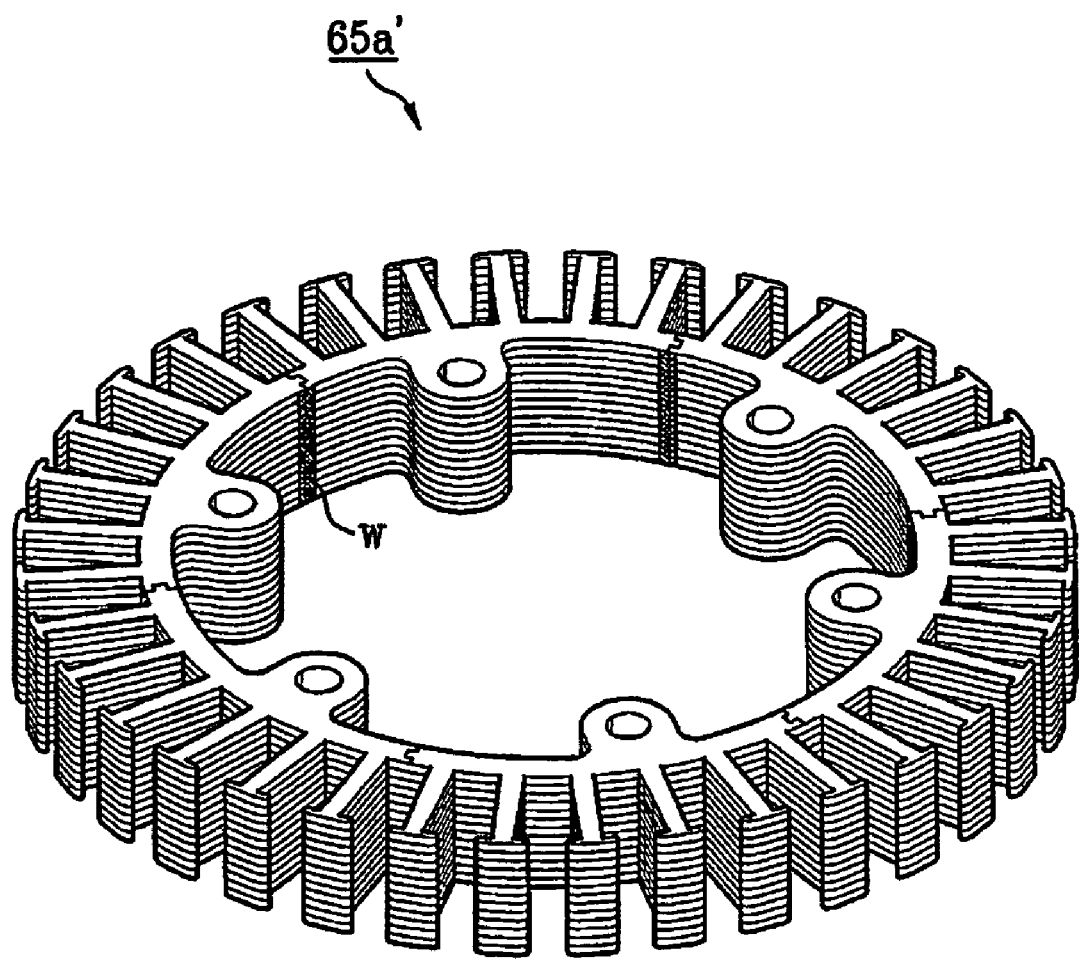
FIG. 14 illustrates a perspective view of a split core, as an example of the core structure in FIG. 13.

In the meantime, FIG. 13 illustrates a perspective view of another example of a stator applicable to the present invention, and FIG. 14 illustrates a perspective view of a split core, as an example of the core structure in FIG. 13. In the case of the stator 65' in FIG. 13, instead of the helical core 65a, a split core is used.

The split core 65a' is fabricated by forming core pieces each divided along a circumferential direction on a mother work piece of a steel plate having the T's 654a and the base portion 652a, and connecting the core pieces with welding.

'W' in the drawing denotes a welded portion.

In this case, though an insulator 65b of core pieces held together is shown, the core may be insert molded such that the insulator encloses the core, completely.

Figure 15:
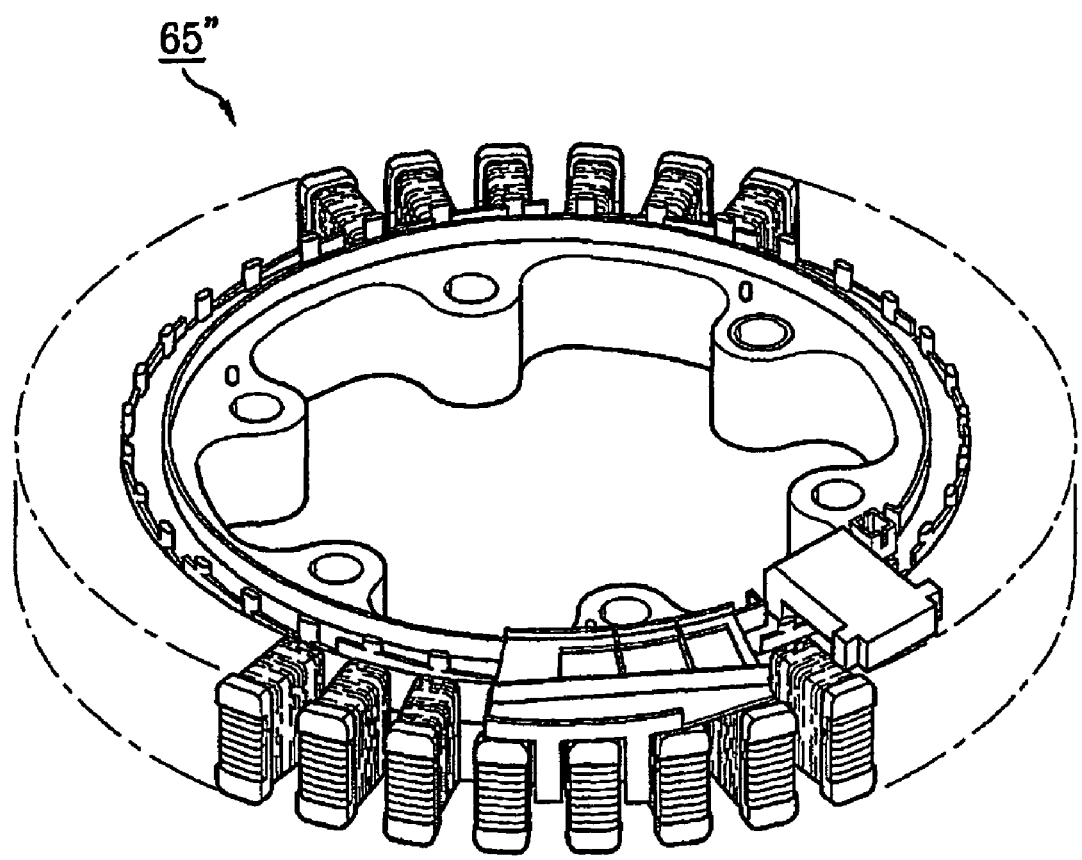
FIG. 15 illustrates a perspective view of another example of a stator applicable to the present invention.
Figure 16:
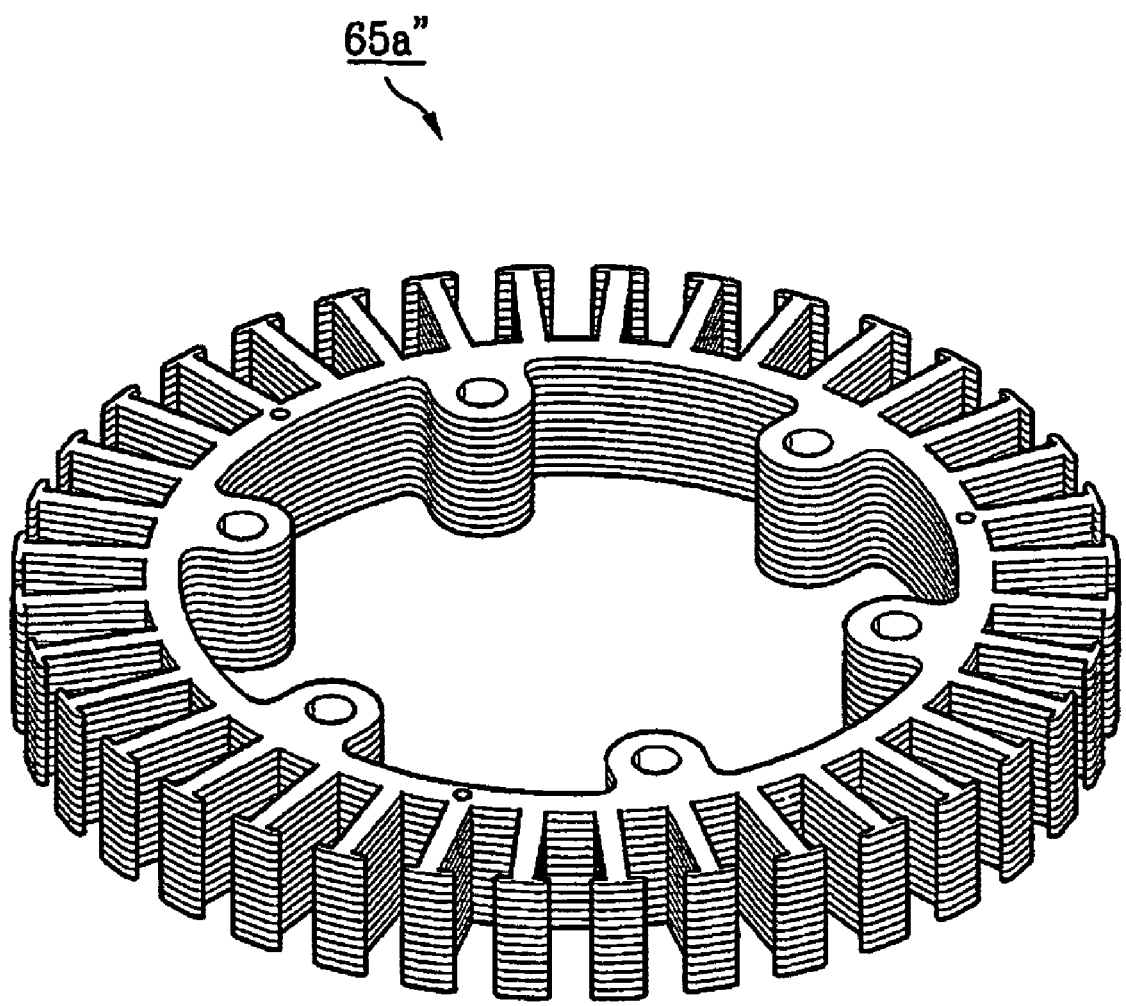
FIG. 16 illustrates a perspective view of a one pieced core, as an example of a core structure in FIG. 15.

In the meantime, FIG. 15 illustrates a perspective view of another example of a stator applicable to the present invention, and FIG. 16 illustrates a perspective view of a one pieced core, as an example of a core structure in FIG. 15, wherein the stator 65" in FIG. 15 illustrates a case of one pieced core 65a" of a steel plate with the T's 654a and the base portion 652a, having no cut along a circumferential direction, instead of the helical core 65a, or the split core. The one pieced core is illustrated in FIG. 16.

Though FIG. 15 illustrates a case when the core is insert molded such that the insulator encloses the core completely, the insulator of core pieces held together as shown in FIG. 14 can be used.

In the meantime, in above embodiment, the sirocco fan 50 is fastened to the shaft 68 so as to be rotatable with the shaft 68 as an end of a bolt passed through the bolt fastening hole 560c is pressed onto the flat section at the outside circumference of the end of the shaft 68. However, not only such a fastening structure enables fastening of the sirocco fan 50 to the shaft 68.

Though not shown, in the same principle of configuration in which the rotor bushing 70 and the shaft 68 passed through a central portion thereof are held together with the bolt 15b, the sirocco fan 50 and the shaft 68 may be held together with a bolt that passes through a central portion of the main plate 54 of the sirocco fan 50, and an end of the shaft 68.

An example of application of the fan apparatus 1 to the air conditioner outdoor unit of the front suction/discharge type will be described with reference to FIGS. 18~20 together with the drawings of the foregoing embodiment.

Figure 18:
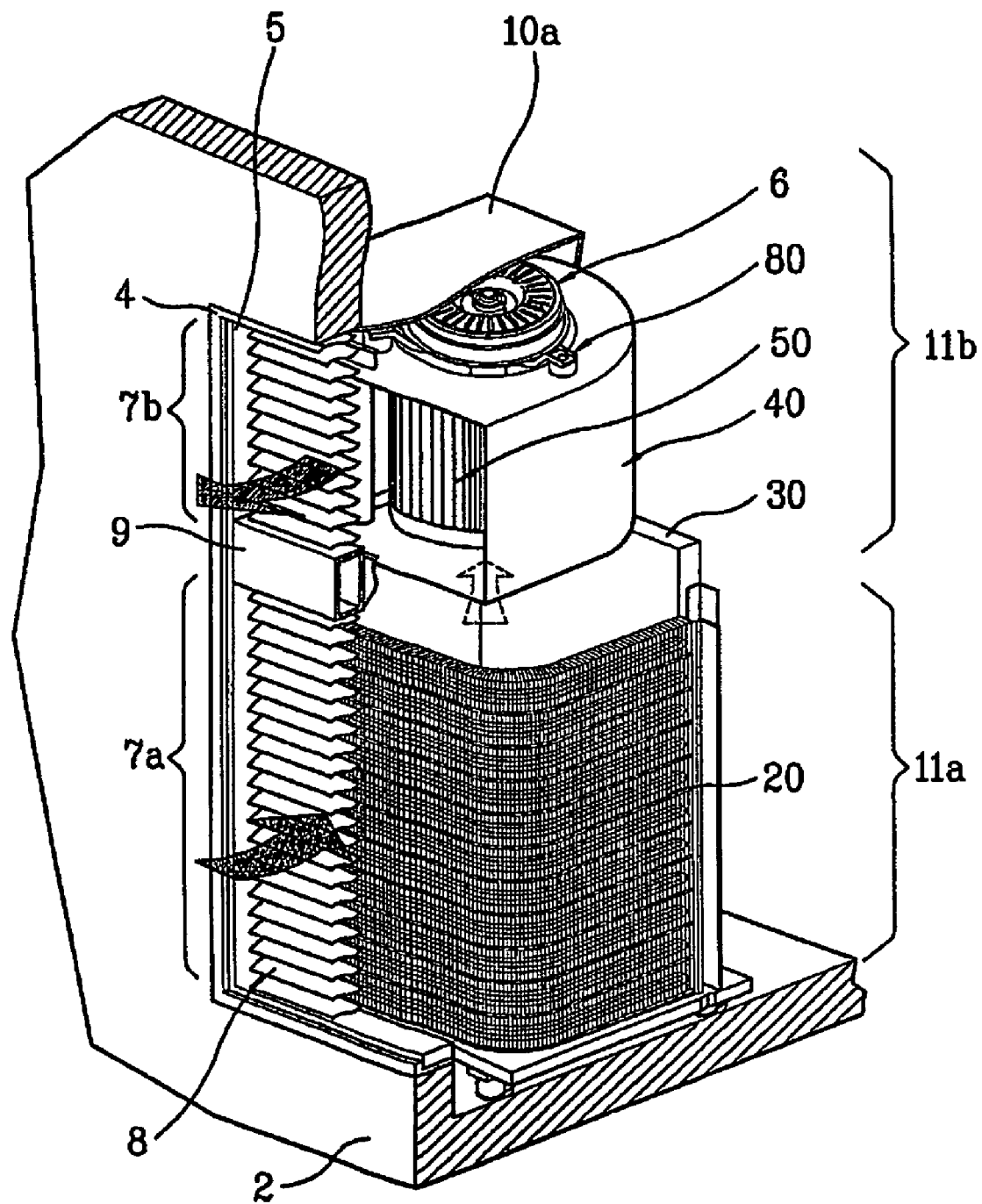
FIG. 18 illustrates a perspective view showing an installation state of an air conditioner outdoor unit of a front suction/discharge type having a fan apparatus of the present invention applied thereto, with a partial cut away view.
Figure 19:
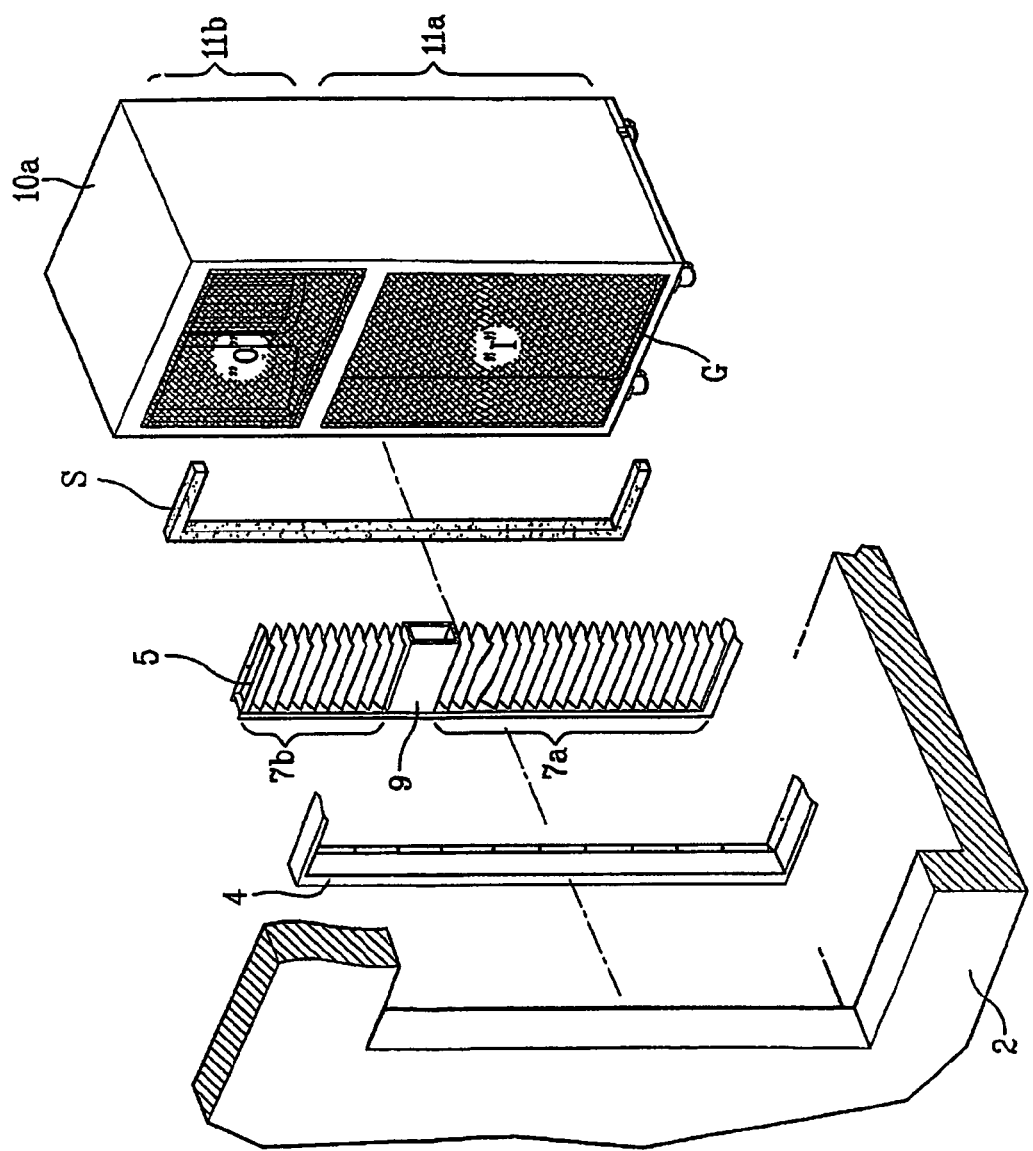
FIG. 19 illustrates a disassembled perspective view showing an installation state of an air conditioner outdoor unit of front suction/discharge type having the fan apparatus of the present invention applied thereto.
Figure 20:
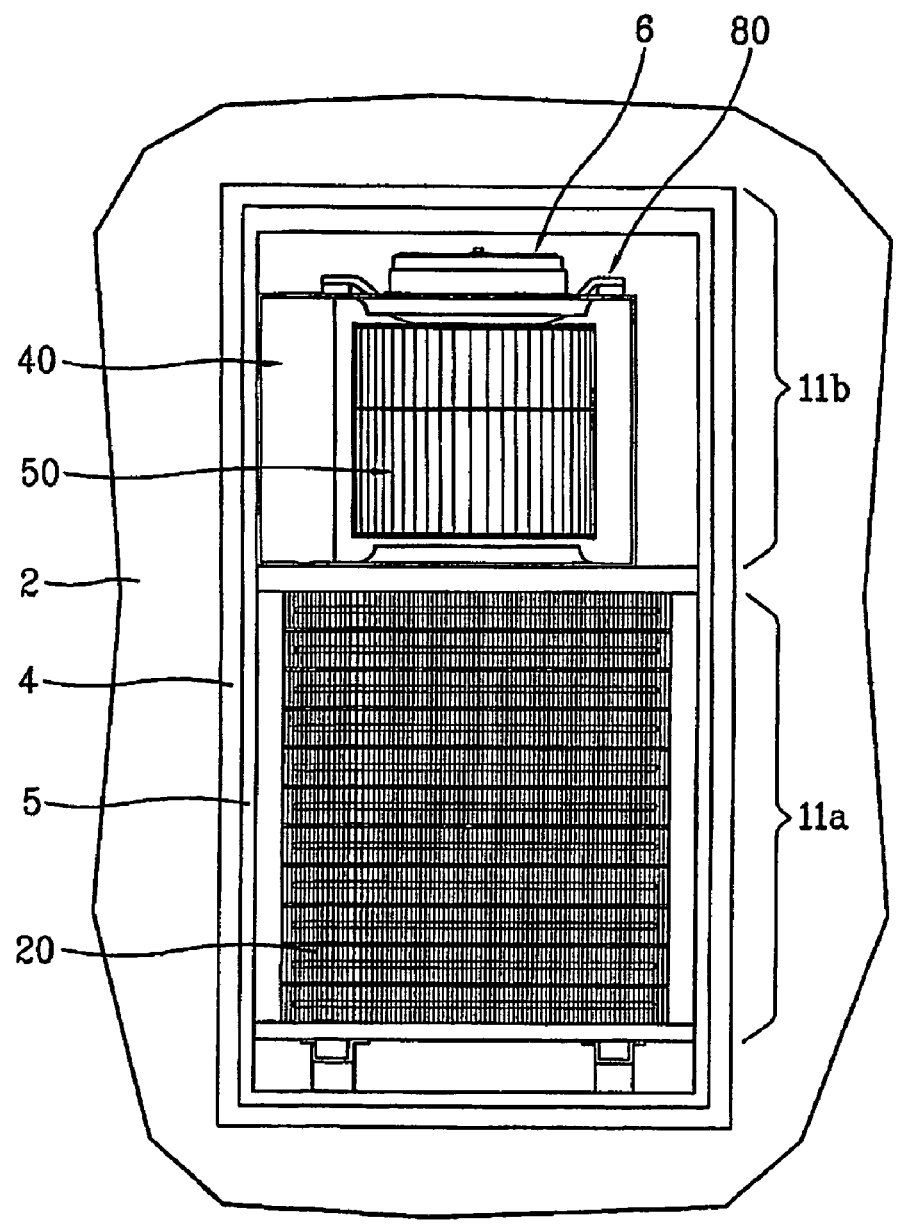
FIG. 20 illustrates a front view showing an installation state of an air conditioner outdoor unit of front suction/discharge type having the fan apparatus of the present invention applied thereto.

FIGS. 18~20 illustrate a perspective view with a partial cut away view, a disassembled perspective view, and a front view showing installation states of the air conditioner outdoor unit of the front suction/discharge type, respectively.

Referring to FIGS. 18~20, the air conditioner outdoor unit of the front suction/discharge type includes a case 10' having an opened front and various parts held therein. The air conditioner outdoor unit of the front suction/discharge type is installed in a rectangular space in an outside wall 2 of a residential or commercial building.

In detail, securely mounted on an inside wall of the space in an outside wall 2 of the building is an outer frame 4, securely mounted on an inside of the outer frame 4 is an inner frame 5 (depending on cases, the outer and inner frames 4, and 5 may be formed as one unit), across a middle of an inside area of the inner frame 5 is a middle isolating bar 9 for dividing the inside area of the inner frame 5 into a inlet area 7a and a outlet area 7b in up/down direction, mounted in each of the areas is a plurality of louver blades 8 for suction/discharge of air between gaps of the blades 8, closely mounted on an inside of the inner frame 5 is the outdoor unit, and between the inner frame 5 and the outdoor unit is sealing member 'S' for preventing leakage of air and damping vibration.

The air conditioner outdoor unit of the front suction/discharge type installed thus includes an inlet 'I' and an outlet 'O' in a lower side and an upper side of the opened front of the case 10a, a compressor (not shown) and a heat exchanger 20 built in on an inner side of the inlet 'I' for compression and condensing refrigerant, and a fan apparatus 1 built in on an inner side of the outlet 'O' for blowing air, wherein the fan apparatus 1 includes a sirocco fan 50, a kind of centrifugal fan, inside of a fan housing 40 securely mounted on an inner side of the outlet 'O' as a fan, and a BLDC motor 6 connected to the sirocco fan and securely mounted on the fan housing 40 with a separate supporter 80 for rotating the sirocco fan 50.

The case 10a includes an inlet portion 11a and an outlet portion 11b in correspondence to the inlet area 7a and the outlet area 7b on inner sides of the inlet 'I' and outlet 'O' respectively, and preferably grills G on the inlet 'I' and the outlet 'O' of the opened front for preventing infiltration of large sized foreign matters, bugs, animals, and the like.

For reference, it can be noted that the case 10a is slightly different from the outside case 10 of the fan apparatus described before, because the case 10a is taken, not only the front suction, but also installation of a heat exchanger, and the like on an inside thereof into account.

Moreover, the case 10a has various units, such as the compressor, and the heat exchanger 20 securely mounted on the inlet portion 11a and the outlet portion 11b with various shapes of brackets (not shown), and the case 10a is mounted such that the opened front of the case 10a is in close contact with the sealing member 'S' at an inside of the inner frame 5.

Of course, the compressor and the heat exchanger 20 are mounted so as to be connected to the heat exchanger (not shown) in the indoor unit with refrigerant pipelines, the other expansion means (not shown), such as capillary tube or expansion valve, are also mounted so as to be connected between the outdoor unit heat exchanger and the indoor unit with refrigerant pipelines. Above configuration enables the refrigerant to cool a space the indoor unit is installed therein as the refrigerant is compressed, condensed, expanded, and evaporated while the refrigerant circulates a refrigerating cycle with the compressor, the outdoor side heat exchanger 20, the expansion means, the indoor side heat exchanger.

The outdoor heat exchanger 20 has a plurality of 'U' bent refrigerant pipes with a plurality of cooling fins 602c fitted thereto, the compressor mounted on an inner side, and a control box 30 on a rear side for controlling operation of various units in the outdoor unit.

The fan apparatus 1 is securely mounted on the outdoor unit heat exchanger 20, wherein, after the sirocco fan 50 and the BLDC motor 6 are connected to each other, the sirocco fan 50 and the BLDC motor 6 are securely mounted inside of the fan housing 40 with the supporter 80, and the fan housing 40 is securely mounted on the outdoor unit heat exchanger 20 so as to be positioned at the outlet 11b of the case 10a with a separate bracket (not shown).

In more detail, the sirocco fan 50 is a kind of centrifugal fan which draws air in an axial direction and discharges the air in a circumferential direction, and has an air flow rate relatively higher than an axial fan.

The sirocco fan 50 has a structure the same with the foregoing embodiment.

Next, the fan housing 40 has air inlets 410a and 410b in top and bottom for drawing air passed through the outdoor side heat exchanger 20 in an axial direction of the sirocco fan 50, preferably with shrouds 44 on the inlets 410a and 410b respectively for guiding the air, and an air outlet for discharging the air in a circumferential direction of the sirocco fan 50.

The air outlet in the fan housing 40 is in communication with the outlet 'O' in the case 10a.

In the meantime, the BLDC motor 6, using, not a brush, but a driving circuit in converting AC to DC, has not sparks occurred and no hazard of gas explosion because the BLDC motor 6 has no brush, makes a stable driving in most of speed range, and has a high efficiency in a range of 70~80%. In detail, the BLDC motor 6 includes a shaft 68 for transmission of power to the sirocco fan, a stator 65, a rotor 60, and magnets 60b for generating rotating force by electro-magnetic force to drive the shaft 68, and a hole sensor 200 for detecting a position of the rotor 60, for controlling a current supplied thereto.

Particularly, the BLDC motor 6 is securely mounted on a side of the top air inlet 410b of the fan housing 40 having a relatively low flow rate with the supporter 80 for reducing suction flow resistance.

In more detail, the shaft 68 is rotatably supported on the supporter 80 with bearings 69a and 69b, such as ball bearings, in a state the shaft 68 is passed through the supporter 80, with an end thereof coupled to an upper shaft center of the sirocco fan 50 by bolt fastening, or caulking, and the stator 65 is securely mounted on the supporter 80, with a predetermined gap to an outside circumference of the shaft 68.

Along with this, the rotor 60 has an outside circumferential portion positioned around an outside circumference of the stator 65, and an inside circumference portion securely mounted on the shaft 68, wherein the rotor has a plurality of ribs, or embossed portions on a bottom extended in a radial direction for reinforcement against centrifugal force, a plurality of the permanent magnets 68 are securely mounted on an outside circumferential portion of the rotor 60 along a circumferential direction at regular intervals for generating electro-magnetic force with the stator 65, and the hole sensor 200 is securely mounted on a core side of the stator 65.

Therefore, if a current flows to the coils 65c of the stator 65 in succession, the rotor 60 rotates by electro-magnetic force between the current in the coil and the magnet 60b, and the rotation force of the rotor 60 rotates the sirocco fan 50 though the shaft 68.

Next, the supporter 80 mounts the sirocco fan 50 and the BLDC motor 6 hung from the fan housing 40 in an inside thereof. In detail, the supporter 80 includes a cylindrical bearing housing portion 72 having the shaft 68 rotatably mounted thereon by the bearings 69a and 69b, a stator securing portion 84 formed as one unit with the bearing housing portion 72 at an upper end thereof for securely mounting the stator 65 in a state the stator 65 is placed thereon, and a plurality of supporter securing portions 86 projected in a radial direction from a circumference of the stator securing portion 84 at regular intervals and fastened to a periphery of the air inlet 410b in the top of the fan housing 40.

The bearing housing portion 72 of a cylindrical shape with a length shorter than the shaft 68 has the bearings 69a and 69b for rotatably supporting the shaft 68, and the stator securing portion 84 has a plurality of positioning holes 842 and fastening holes 846 for fastening screws in a state the stator 65 is inserted in an upper surface thereof.

Along with this, it is preferable that the supporter 80 has three supporter securing portions 86 around the bearing housing portion 82 and the stator securing portion 84 at 120° intervals for spreading load thereon, and a reinforcing rib 88a is formed between the bearing housing portion, the stator securing portion 84, and the supporter securing portion 86 for supporting an underside of the stator securing portion 84 and the supporter securing portion 84 to reinforce a strength of the supporter securing portion 86, and it is more preferable that a plurality of supplementary reinforcing ribs 88b and 88c are formed on upper sides of the supporter securing portions, too.

Particularly, the supporter securing portions 86 are projected in a radial direction from the stator securing portion 84, and have middle portions each sloped upward the more as it goes toward the radial direction the further, and horizontal end portions having a vibration damping member securing hole 866. Accordingly, the supporter 80 is mounted such that the supporter securing portions 86 are fastened to a periphery of the air inlet 410b in a top of the fan housing 40.

A process for assembling the fan apparatus, a main unit of the present invention, and the operation of the outdoor unit will be described.

First, the BLDC motor 6 forms a motor assembly as the shaft 68 is rotatably mounted on the bearing housing portion 82 of the supporter 80 with the bearings 69a and 69b and the stator 65 is secured to the upper surface of the stator securing portion 84 with screws, and the motor assembly is mounted such that the shaft 68 is coupled to a shaft center of the sirocco fan 50 in a state the sirocco fan 50 is positioned inside of the fan housing 40, and the supporter 80 is mounted on the fan housing as the supporter securing portions 86 of the supporter 80 are placed on, and fastened to, the periphery of the top air inlet 410b on the upper surface of the fan housing with bolts or the like.

Accordingly, the fan apparatus 1 having the BLDC motor 6 thereon is securely mounted on the outdoor heat exchanger 20 with a separate bracket in a state the fan apparatus 1 is placed thereon, and the BLDC motor 6 is connected to the control box 30 with wires for controlling operation of the BLDC motor 6.

With regard to the operation of the outdoor unit assembled thus, the compressor is operated in response to a signal from the control box 30, according to which the refrigerant is introduced into the indoor unit through the compressor, the outdoor heat exchanger 20, and the expansion means, and circulated along the indoor heat exchanger.

In this instance, since the refrigerant circulates through the outdoor heat exchanger 20, and the sirocco fan 50 is driven by the BLDC motor 6, the air drawn through the inlet 'I' in the case 10a makes heat exchange with the refrigerant as the air passes through the outdoor heat exchanger 20, to condense the refrigerant, and passes the sirocco fan 50, and is discharged through the outlet 'O' in the case 10a.

Of course, because the BLDC motor 6 has a wide range of stable torque characteristic, the BLDC motor 6 can make stable operation in a variety of speeds, enabling reduction of noise, and power consumption.

According to this, since the sirocco fan 50 which is a kind of centrifugal fan draws air in an axial direction by driving such a BLDC motor 6, most of the air passed through the outdoor heat exchanger 20 is drawn through the bottom air inlet 410a of the fan housing 40, and rest portion of the air is drawn through the top air inlet 410b, and the air is guided by the shrouds 44 on the air inlets 410a and 410b to flow in an axial direction of the sirocco fan 50 and discharged in a circumferential direction, and, therefrom is guided by the fan housing 40 and discharged through the outlet 'O' in the case 10a in communication with the air outlet in the fan housing.

Since the BLDC motor 6 is mounted on a side of the air inlet 410b which has a lower air flow rate relatively of the air inlets 410a and 410b of the fan housing 40, not only a suction flow resistance can be minimized but also fan efficiency and heat exchange efficiency can be enhanced as the BLDC motor makes stable operation at a high efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Industrial Applicability

As has been described, the air conditioner outdoor unit of the front suction/discharge type: of the present invention permits to drive the BLDC motor while varying a speed of the motor widely, and to reduce noise, and power consumption, because the BLDC motor is applied for driving the fan, which can make stable operation in most of rotation speeds and has a high efficiency.

Moreover, the air conditioner outdoor unit of the front suction/discharge type of the present invention permits, not only effective secure mounting of the BLDC motor in the fan housing, because the BLDC motor is securely mounted on a side of the fan housing having a lower suction flow rate by using a separate supporter, but also to reduce an overall size of the fan apparatus by mounting a portion of the BLDC motor sunken in an inside of the fan housing.

What is claimed is:

1. A fan apparatus for an air conditioner, comprising:
   an outside case;
   a fan housing secured to an inside of the outside case, the fan housing comprising:
      a bottom wall;
      a top wall positioned vertically above the bottom wall;
      a plurality of sidewalls extending between the top wall and the bottom wall;
      air inlets respectively formed in the bottom wall and the top wall; and
      an air outlet formed in one of the plurality of sidewalls;
   a fan mounted in the fan housing;
   a BLDC motor including a rotor and a stator positioned in the rotor;
   a shaft having a first end coupled to the rotor and a second end coupled to the fan for transmission of driving force from the rotor to the fan;
   bearings for supporting the shaft; and
   a supporter secured to the fan housing so as to securely mount the motor to the air inlet formed in the top wall, wherein the supporter supports the stator and rotatably supports the shaft, wherein the supporter includes:
      a cylindrical bearing housing portion having the bearings mounted therein;
      stator securing portions extending radially outward from an outer circumferential surface of the cylindrical bearing housing portion to receive the stator mounted thereon; and
      supporter securing portions provided at distal end portions of the stator securing portions and fastened to the top wall of the fan housing at a periphery of the air inlet formed in the top wall, wherein the motor is secured to the stator securing portions at a top side of the supporter, the shaft extends from the motor through a central opening of the supporter at which the bearing housing portion is formed, and the fan is coupled to the second end of the shaft within the fan housing and below the supporter such that the supporter and motor and fan coupled thereto are suspended in the fan housing.

2. The fan apparatus as claimed in claim 1, wherein the stator is securely mounted on the supporter so as to position the stator inside of the rotor to maintain concentricity with the rotor.

3. The fan apparatus as claimed in claim 1, wherein the outside case includes a plurality of openings formed therein corresponding to the air outlet and the at least one air inlet formed in the fan housing, and a grill provided at an opening of the plurality of openings corresponding to the air outlet of the fan housing.

4. The fan apparatus as claimed in claim 1, wherein a first air inlet of the plurality of air inlets is formed in the bottom wall and the air outlet is formed in the one of the plurality of sidewalls, and wherein a pass through hole is formed in the top wall so as to provide an opening for mounting the BLDC motor within the fan housing.

5. The fan apparatus as claimed in claim 4, wherein the fan is a centrifugal fan.

6. The fan apparatus as claimed in claim 5, wherein the fan is a sirocco fan.

7. The fan apparatus as claimed in claim 6, wherein the fan housing has an axis eccentric to an axis of the sirocco fan.

8. The fan apparatus as claimed in claim 4, wherein the fan housing is formed of a metal plate.

9. The fan apparatus as claimed in claim 8, wherein the fan housing includes a reinforcement portion on a top wall thereof for reinforcement.

10. The fan apparatus as claimed in claim 9, wherein the reinforcement portion on the top wall of the fan housing extends in a substantially circumferential direction.

11. The fan apparatus as claimed in claim 10, wherein the reinforcement portion on the top wall of the fan housing is formed with a varied width.

12. The fan apparatus as claimed in claim 4, wherein the fan housing includes shrouds on inside surfaces of the top and bottom walls thereof.

13. The fan apparatus as claimed in claim 12, further comprising vibration damping pads provided at positions where the fan housing and the shrouds are in contact.

14. The fan apparatus as claimed in claim 1, further comprising a bracket between the outside case and the fan housing for supporting the fan housing on the outside case.

15. The fan apparatus as claimed in claim 14, wherein the bracket is extended from the outside case and fastened to the top of the fan housing.

16. The fan apparatus as claimed in claim 1, wherein the supporter is bent upward toward the top of the fan housing such that end portions of the plurality of supporter securing portions are positioned above a stator fastening surface, for positioning at least the stator fastening surface of the supporter inside of the fan housing when the supporter is mounted on the fan housing.

17. The fan apparatus as claimed in claim 16, wherein the supporter has pass through, holes formed in the at least stator securing portions.

18. The fan apparatus as claimed in claim 1, wherein the plurality of supporter securing portions include a reinforcing rib.

19. The fan apparatus as claimed in claim 1, wherein the supporter is a cast.

20. The fan apparatus as claimed in claim 1, wherein the supporter and the stator include positioning projections and positioning holes formed in correspondence to each other for aligning concentricity of the supporter and the stator in fastening the stator to the supporter.

21. The fan apparatus as claimed in claim 1, wherein the top wall of the fan housing and the supporter include positioning projections and positioning holes formed in correspondence to each other for aligning the supporter and the top of the fan housing in mounting the supporter on the top of the fan housing.

22. The fan apparatus as claimed in claim 21, wherein the positioning projections and the positioning holes have an arc shape or an elongated shape.

23. The fan apparatus as claimed in claim 1, further comprising a vibration damping member positioned between each of the plurality of supporter securing portions of the supporter and the fan housing.

24. The fan apparatus as claimed in claim 23, wherein the vibration damping member includes:
a body portion in contact with the fan housing; and
a head portion configured to be forcibly inserted through a vibration damping member securing hole formed in the plurality of supporter securing portions and held at the plurality of supporter securing portions.

25. The fan apparatus as claimed in claim 24, wherein the vibration damping member further includes a cover bracket placed on the head portion of the vibration damping member for preventing damage of the vibration damping member caused by a fastening force of a fastening member inserted through the vibration damping member in fastening the supporter to the fan housing.

26. The fan apparatus as claimed in claim 1, wherein the fan is a sirocco fan, including:
a main plate provided at an inside of the fan for connecting blades formed along a circumference direction; and
a bushing provided at a center of the main plate for coupling the shaft to the sirocco fan.

27. The fan apparatus as claimed in claim 26, wherein the bushing includes;
a base portion having a disc shape and in close contact with the main plate; and
a hub portion projected from a center of the base portion in an axial direction, the hub portion having an inserting hole at a center thereof.

28. The fan apparatus as claimed in claim 27, wherein the main plate is mounted at a position nearer to the motor with reference to the middle of a length of the sirocco fan.

29. The fan apparatus as claimed in claim 26, wherein the bushing includes two pieces riveted or fastened with screws in a state the two pieces are closely fitted to opposite sides of the main plate.

30. The fan apparatus as claimed in claim 27, wherein the hub portion has at least one bolt fastening hole in an outside circumferential surface, and the shaft has a flat section on an outside circumferential surface of an end portion.

31. The fan apparatus as claimed in claim 1, wherein the rotor includes a rotor frame and a rotor bushing that is joined with the shaft and the rotor frame in a state in which the rotor bushing is positioned over the rotor frame.

32. The fan apparatus as claimed in claim 31, wherein the rotor bushing includes:
a tooth portion for inserting the shaft in a center thereof and engaging the shaft therewith; and
a joining portion extended from a circumference of the tooth portion in a radial direction for joining with the rotor frame.

33. The fan apparatus as claimed in claim 32, wherein the rotor bushing further includes a plurality of positioning projections each formed as a unit therewith and projected from the joining portion toward the rotor frame.

34. The fan apparatus as claimed in claim 32, wherein the joining portion of the rotor bushing has pass through holes for fastening to the rotor frame with bolts.

35. The fan apparatus as claimed in claim 32, wherein at least one of the tooth portion and the joining portion of the rotor bushing includes reinforcing ribs.

36. The fan apparatus as claimed in claim 32, wherein the shaft has serration on an outside circumferential surface of a top end portion, and the rotor bushing has serration on an inside circumferential surface of a central hole in the tooth portion, for engagement with the serration of the shaft.

37. The fan apparatus as claimed in claim 32, wherein the rotor bushing is formed of synthetic resin.

38. The fan apparatus as claimed in claim 1, wherein the rotor includes a rotor frame and a rotor bushing that is joined with the shaft and the rotor frame in a state in which the rotor bushing is positioned under the rotor frame.

39. The fan apparatus as claimed in claim 1, wherein the rotor includes a rotor frame, and magnets mounted on an inside of the rotor frame.

40. The fan apparatus as claimed in claim 39, wherein the rotor frame is formed of a steel plate.

41. The fan apparatus as claimed in claim 39, wherein the rotor frame is injection molded.

42. The fan apparatus as claimed in claim 39, wherein the rotor frame is formed of a steel plate and an injection molding of synthetic resin covering an outside thereof.

43. The fan apparatus as claimed in claim 39, wherein the rotor frame includes:
a substantially disc shape bottom portion; and
a sidewall portion that extends in a substantially vertical direction from an outer circumference of the bottom portion, wherein the sidewall portion has a bent portion formed in a circumferential direction that forms a seating surface for supporting magnets mounted on an inside surface of the sidewall portion, and the bottom portion has a hub portion having a pass through hole formed at a central portion thereof so as to receive fastening members therethrough for fastening the rotor to the shaft.

44. The fan apparatus as claimed in claim 43, wherein the bottom portion and the sidewall portion are formed a single unit by pressing.

45. The fan apparatus as claimed in claim 43, wherein a circumterential edge of an opening defined by the sidewall portion includes a first bend in a radial direction and a second bend in a different direction.

46. The fan apparatus as claimed in claim 45, wherein the second bend extends from the first bend toward the bottom portion.

47. The fan apparatus as claimed in claim 43, wherein the rotor frame includes a plurality of cooling fins formed around the hub portion in a radial direction for blowing air toward the stator to cool heat generated at the stator when the rotor rotates, each of the cooling fins having a predetermined length in a radial direction.

48. The fan apparatus as claimed in claim 47, wherein the cooling fins are formed by lancing, such that the cooling fins are directed toward the opening in the rotor frame, and wherein pass through holes formed by the lancing serve as vent holes.

49. The fan apparatus as claimed in claim 48, wherein the cooling fin is bent at 90° to the bottom portion such that the cooling fin is directed toward the opening of the rotor.

50. The fan apparatus as claimed in claim 48, wherein the rotor frame includes embossed portions in the bottom portion between adjacent cooling fins for reinforcing the rotor frame, each with a drain hole for draining water.

51. The fan apparatus as claimed in claim 39, wherein the magnets have a round shape.

52. The fan apparatus as claimed in claim 39, wherein the magnets have a 'C shape.

53. The fan apparatus as claimed in claim 1, wherein the stator includes:
a core made of a magnetic material so as to form a path of a magnetic flux;
an insulator enclosing the core; and
coils wound on each of a plurality of teeth extending outward from the core.

54. The fan apparatus as claimed in claim 53, wherein the core is a multiple layered annular helical core of a steel plate wound in a helix from a bottom layer to a top layer, the steel plate having a base portion with the plurality of teeth extending therefrom.

55. The fan apparatus as claimed in claim 53, wherein the core is a split core formed by core pieces each divided along a circumferential direction of a steel plate having a base portion and the plurality of teeth, with the core pieces being connected by welding.

56. The fan apparatus as claimed in claim 53, wherein the core is one piece core of a steel plate having a base portion and the plurality of teeth, the steel plate being continuous along a circumferential direction without discontinuity.

57. The fan apparatus as claimed in claim 53, wherein the insulator is insert molded to enclose the core.

58. The fan apparatus as claimed in claim 53, wherein the insulator includes an upper insulator mounted on an upper portion of the core, and a lower insulator mounted so as to enclose a lower portion of the core.

59. The fan apparatus as claimed in claim 53, wherein the stator includes:
a multiple layered annular helical core formed by a steel plate wound in a helix from a bottom layer to a top layer, the steel plate having a base portion and the plurality of teeth;
the insulator mounted on the core so as to enclose the core, the insulator having a joining portion that projects toward an inner side of the core, the joining portion having fastening holes formed therein for fastening the stator to the fan housing; and
the coils each wound on each of the plurality of teeth.

60. The fan apparatus as claimed in claim 59, wherein the joining portion on the stator includes at least three projections that project toward the inner side of the core.

61. The fan apparatus as claimed in claim 59, wherein a height of the joining portion is greater than at least 20% of a total height of the core.

62. The fan apparatus as claimed in claim 59, wherein the joining portion includes metal tubes respectively press fit into the fastening holes.

63. The fan apparatus as claimed in claim 59, wherein the multiple layers of the helical core are held together with rivets that pass through pass through holes formed in the base portion.

64. The fan apparatus as claimed in claim 59, wherein the helical core includes slots formed in the base portion so as to reduce stress when the core is wound.

65. The fan apparatus as claimed in claim 64, wherein the slots formed in the base portion are rectangular or trapezoidal.

66. The fan apparatus as claimed in claim 1, wherein a plurality of steps are formed on an inner circumferential surface of the bearing housing portion, wherein a step at a lower portion has an "]" shape for supporting an upper end of a lower bearing , and a step at an upper portion has an "L" shape for supporting a lower end of the upper bearing.

67. The fan apparatus as claimed in claim 1, wherein the shaft includes positioning steps at an upper portion and a lower portion of an outside circumferential surface thereof for positioning bearings on the shaft.

68. The fan apparatus as claimed in claim 1, wherein the stator securing portions comprise at least three stator securing portions, and wherein proximal ends of each of the stator securing portions protrude directly outward in a radial direction from the outer circumferential surface of the bearing housing portion, and wherein proximal ends of each of the supporter securing portions protrude directly outward in a radial direction from an outer circumferential surface of its respective stator securing portion.

69. The fan apparatus as claimed in claim 68, wherein a predetermined angle is formed between adjacent stator securing portions of the at least three stator securing portions such that each of the at least three stator securing portions extends independently outward in a radial direction from the outer circumferential surface of the bearing housing portion.

* * * * *